US012784694B2

(12) United States Patent
Zhang

(10) Patent No.: US 12,784,694 B2
(45) **Date of Patent: *Nov. 3, 2026**

(54) GATE DRIVER UNIT AND DISPLAY PANEL

(71) Applicant: WUHAN CHINA STAR OPTOELECTRONICS SEMICONDUCTOR DISPLAY TECHNOLOGY CO., LTD., Wuhan (CN)

(72) Inventor: Huanxi Zhang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/195,695

(22) Filed: Apr. 30, 2025

(65) Prior Publication Data

US 2025/0259604 A1 Aug. 14, 2025

Related U.S. Application Data

(63) Continuation of application No. 18/565,531, filed as application No. PCT/CN2023/131514 on Nov. 14, 2023, now Pat. No. 12,327,527.

(30) Foreign Application Priority Data

Nov. 9, 2023 (CN) ......................... 202311511260.0

(51) Int. Cl.
*G09G 3/32* (2016.01)
*G09G 3/3233* (2016.01)
*G09G 3/3266* (2016.01)

(52) U.S. Cl.
CPC ......... *G09G 3/3266* (2013.01); *G09G 3/3233* (2013.01); *G09G 3/32* (2013.01);
(Continued)

(58) Field of Classification Search
CPC .............. G09G 2300/0809; G09G 2310/0267; G09G 2310/0286; G09G 2310/08; G09G 3/32; G11C 19/28
See application file for complete search history.

(56) References Cited

U.S. PATENT DOCUMENTS

| | | | | |
|---|---|---|---|---|
| 2011/0234565 A1* | 9/2011 | Morii | G09G 3/3677 377/79 |
| 2015/0269900 A1* | 9/2015 | Iwamoto | G09G 3/3648 345/100 |
| 2020/0066211 A1 | 2/2020 | Lee et al. | |

FOREIGN PATENT DOCUMENTS

| | | |
|---|---|---|
| CN | 109036282 A | 12/2018 |
| CN | 109272960 A | 1/2019 |

(Continued)

OTHER PUBLICATIONS

International Search Report in International application No. PCT/CN2023/131514, mailed on Aug. 7, 2024.

(Continued)

*Primary Examiner* — Insa Sadio
(74) *Attorney, Agent, or Firm* — PV IP PC; Christopher S. Ruprecht; Wei Te Chung

(57) ABSTRACT

The present application provides a gate driver unit and a display panel, in which at least one of a first node control module and an output control module in a gate driver circuit at present stage is electrically connected to a second node of a gate drive circuit at a preceding stage, so as to ameliorate a problem that a voltage drop of a first gate control signal output by the gate drive circuit is large.

20 Claims, 14 Drawing Sheets

(52) U.S. Cl.
CPC ............... *G09G 2300/0852* (2013.01); *G09G 2300/0861* (2013.01); *G09G 2310/0286* (2013.01); *G09G 2310/08* (2013.01); *G09G 2320/0223* (2013.01)

(56) References Cited

FOREIGN PATENT DOCUMENTS

| | | | |
|---|---|---|---|
| CN | 111145823 | A | 5/2020 |
| CN | 114299848 | A | 4/2022 |
| CN | 115938324 | A | 4/2023 |
| CN | 118658401 | A | 9/2024 |
| CN | 118747990 | A | 10/2024 |
| KR | 20180074169 | A | 7/2018 |

OTHER PUBLICATIONS

Written Opinion of the International Search Authority in International application No. PCT/CN2023/131514, mailed on Aug. 7, 2024.

* cited by examiner

GATE DRIVER UNIT AND DISPLAY PANEL

CROSS-REFERENCE TO RELATED APPLICATION

This application is a continuation application of U.S. application Ser. No. 18/565,531, filed on Nov. 30, 2023, which is a US national phase application based upon an International Application No. PCT/CN2023/131514, filed on Nov. 14, 2023, which claims priority to Chinese Patent Application No. 202311511260.0, filed on Nov. 9, 2023. The entire disclosures of the above applications are incorporated herein by reference in their entireties.

TECHNICAL FIELD

The present application relates to display technologies, and more particularly, to a gate driver unit and a display panel.

BACKGROUND

In a gate driver circuit, serious coupling may occur when transistors using Complementary Metal Oxide Semiconductor (CMOS) design technology output high level signals and low level signals, so that a voltage drop of a gate control signal for driving an oxide transistor output by the gate driver circuit may become large.

SUMMARY OF THE INVENTION

One or more embodiments of the present application provide a gate driver unit and a display panel, which can improve the problem that a voltage drop of a gate control signal output by a gate driver circuit becomes large.

One or more embodiments of the present application provides a gate drive unit including a plurality of gate drive circuits, the gate driver circuits each includes a first node control module, a first output module, an output control module, and a second output module. The first node control module is electrically connected to a first node of the gate driver circuit at a present stage and a second node of the gate driver circuit at the present stage, and configured to transmit a first power supply signal to the first node according to a potential of the second node and a corresponding first clock signal, or transmit a second power supply signal to the first node according to the potential of the second node. The first output module is electrically connected to the first node of the gate driver circuit at the present stage and a first output terminal of the gate driver circuit at the present stage, and configured to output the second power supply signal or a third power supply signal to the first output terminal according to a potential of the first node. The output control module is electrically connected to the first node of the gate driver circuit and a third node of the gate driver circuit at the present stage, and configured to electrically connect the first node and the third node, or to disconnect an electrical connection between the first node and the third node. The second output module is electrically connected to the second node, the third node, and a second output terminal of the gate driver circuit at the present stage, and configured to output a corresponding second clock signal or the first power supply signal to the second output terminal according to the potential of the second node and a potential of the third node. Wherein at least one of the first node control module and the output control module is electrically connected to the second node of the gate driver circuit at a preceding stage.

One or more embodiments of the present application further provides a display panel including a gate drive unit as described above; and a plurality of sub-pixels. At least one of the sub-pixels each including a light emitting device and a pixel driver circuit for driving the light emitting device to emit light, the pixel driver circuit including a driving transistor, a compensation transistor and a data transistor, an input terminal and an output terminal of the compensation transistor being electrically connected between a control terminal and an output terminal of the driving transistor, an input terminal of the data transistor being configured to receive a corresponding data signal, and an output terminal of the data transistor being electrically connected to the input terminal of the driving transistor. Wherein the first output terminals of the plurality of gate driver circuits are electrically connected to the control terminals of the compensation transistors of the plurality of sub-pixels, and the second output terminals of the plurality of gate driver circuits are electrically connected to the control terminals of the data transistors of the plurality of sub-pixels.

Compared with the prior art, in the gate driver unit and the display panel provided in one or more embodiments of the present invention, the second node of a gate driver circuit at a preceding stage is electrically connected to at least one of the first node control module and the output control module in a gate driver circuit at a present stage, so that at least one of the first node control module and the output control module in the gate driver circuit at the present stage is no longer electrically connected to the first output terminal of a different gate driver circuit at the preceding stage, thereby reducing the number of gate driver circuits correspondingly controlled by a first gate control signal output from the first output terminal of the gate driver circuit at the preceding stage. It reduces a load carried by the gate driver circuit at the preceding stage, and ameliorates a problem that a voltage drop of the first gate control signal output from the gate driver circuit is large.

DETAILED DESCRIPTION

It is to be understood that the embodiments described herein are merely illustrative of the present application and are not intended to limit the present application.

Figure 1A:
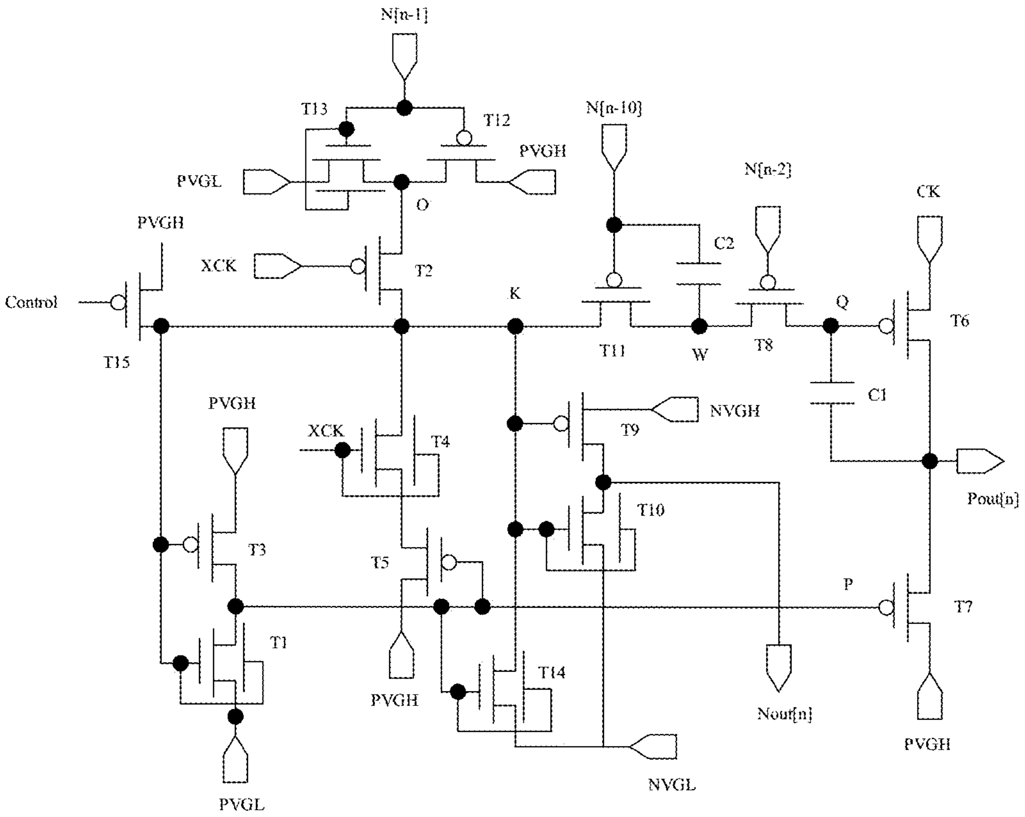
FIGS. 1A-1C are schematic diagrams showing structures of gate driver circuits according to one or more embodiments of the present application.
Figure 1B:
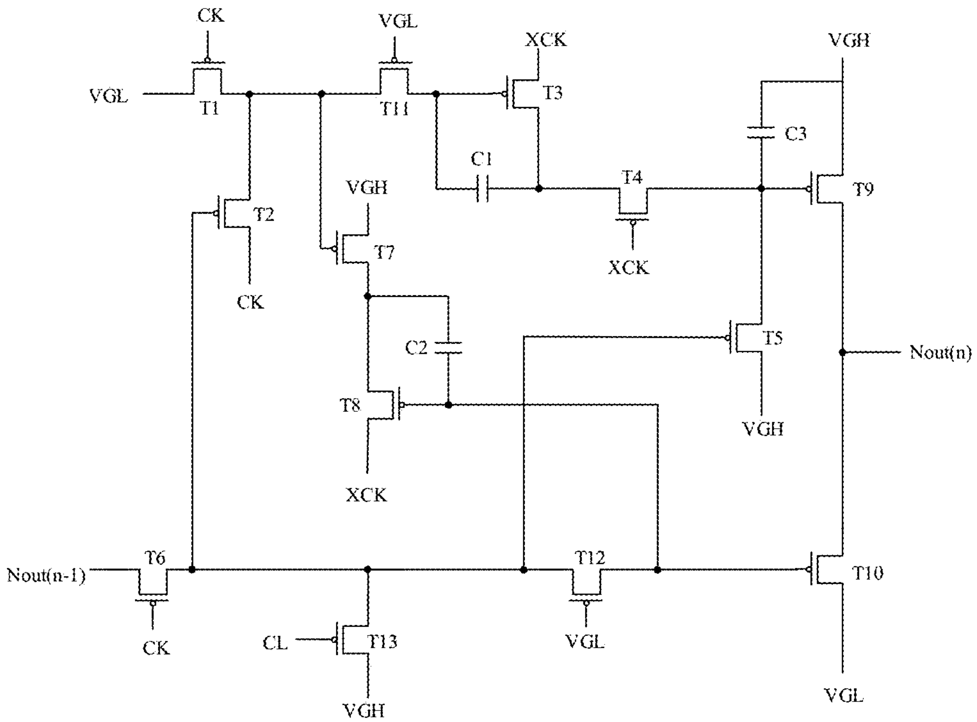
Figure 1C:
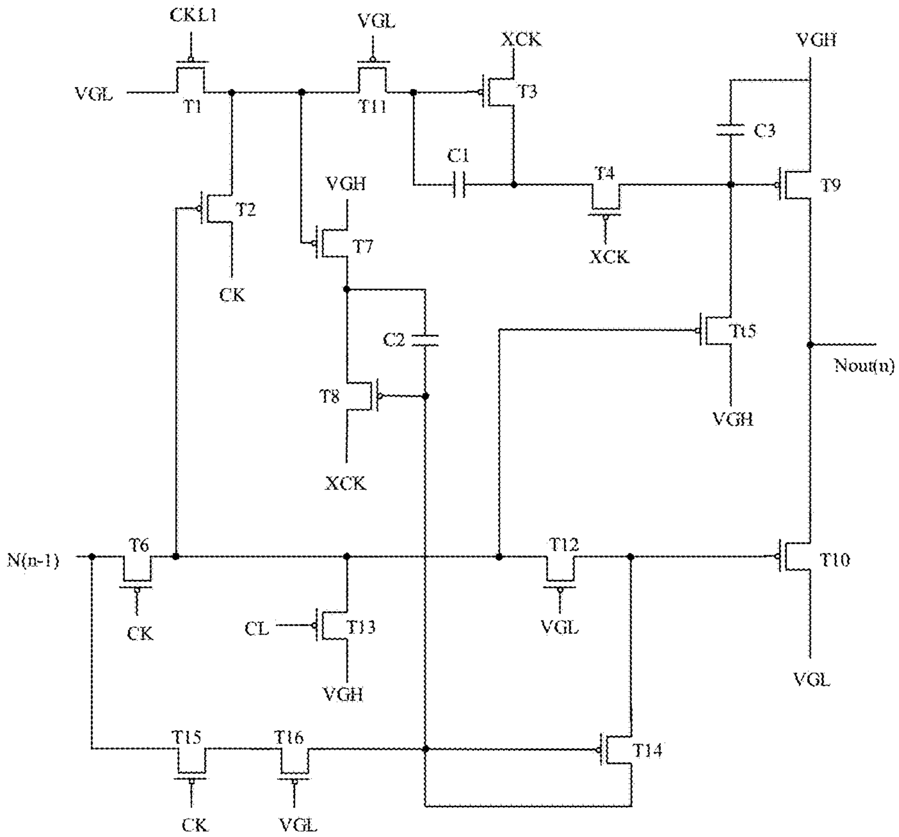
Figure 2:
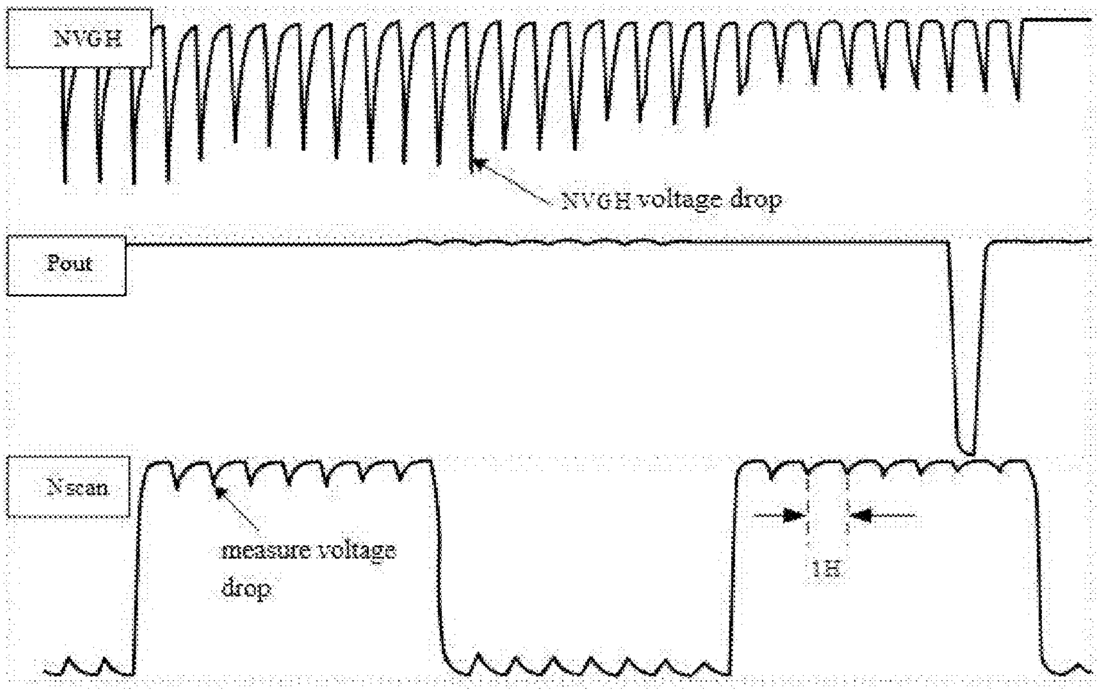
FIG. 2 is a timing diagram corresponding to the gate driver circuit shown in FIG. 1C.

Specifically, FIG. 1A-FIG. 1C are schematic diagrams showing structures of gate driver circuits according to one or more embodiments of the present application. FIG. 2 is a timing diagram corresponding to the gate driver circuit shown in FIG. 1C. A first gate control signal Nscan output by the gate driver circuit (i.e., CMOS GOA) shown in FIG. 1A from a first output terminal Nout is transmitted to a display panel to assist the display panel in implementing a display function. Stability of the first gate control signal Nscan has a significant causal relationship with some indexes for measuring optical performances of the display panel, and the stability of the first gate control signal Nscan has a significant effect on an optical performance of the display panel.

It can be confirmed by an existing simulation model that serious coupling occurs when the first gate control signal Nscan is output both at a high level and a low level. Moreover, the comparison experiment shows that the coupling is more serious for the first gate control signal Nscan outputted from the gate driver circuit shown in FIG. 1A when it is output at the high level and the low level than that from the gate driver circuits shown in FIG. 1B-FIG. 1C.

For example, when the first gate control signal Nscan corresponds to an output of high level, a voltage drop of a power supply signal VGH applied to the gate driver circuits shown in FIG. 1B-FIG. 1C is about 0.7V, and the voltage drop of the first gate control signal Nscan of the gate driver circuit shown in FIG. 1A is about 2V. The reason for this is mainly determined to be the design of the gate driver circuit shown in FIG. 1A. Compared with a stage transmission relationship between an upper stage and lower stage corresponding to the gate driver circuits shown in FIG. 1B-FIG. 1C, the gate driver circuit shown in FIG. 1A corresponds to a stage transmission among a larger number of stages. The first gate control signal Nscan(n) output from an n-th-stage gate driver circuit needs to be transmitted to a (n+10)-th-stage gate driver circuit, a (n+2)-th-stage gate driver circuit, and a (n−1)-th-stage gate driver circuit, so that the n-th-stage gate driver circuit needs to take into account loads of the 4 stages of gate driver circuits of, thereby causing too large a load is generated when the first gate control signal Nscan is controlled by the outputs of the power supply signals (NVGH/NVGL), generating a large voltage drop at the instant when the transistor T9/T10 is turned on, thereby causing a high/low level voltage drop of the first gate control signal Nscan, as shown in FIG. 2.

Moreover, regarding the gate driver circuit shown in FIG. 1A, a pair of voltages NVGH/NVGL is generated for each stage of the gate driver circuit, that is, the voltage across the load generated by the first gate control signal Nscan is all from the NVGH/NVGL. When a plurality of gate driver circuits generate a current pumping during the stage transmission process, the voltage drop caused by the pumping is also from the NVGH/NVGL. This pumping causes the voltage drop of the high level and the low level of the first gate control signal Nscan, and also the capacitance of the load causes the recovery time to become longer.

With respect to the display panel to which the gate driver circuit is applied, the high-level voltage drop problem of the first gate control signal Nscan may cause a horizontal crosstalk of the display panel and a deterioration of a dense horizontal lines, and the low-level voltage drop problem of the first gate control signal Nscan may deteriorate the display of the display panel in the variable refresh frequency mode. Further, a voltage drop occurs at a matching position of the high level of the first gate control signal Nscan output by the present-stage gate driver circuit and the second gate control signal Pscan output by the present-stage gate driver circuit, which aggravates a display unevenness of the display panel.

To improve the voltage drop problem of the first gate control signal Nscan, the present application provides a gate driver unit and a display panel. FIG. 3A-FIG. 3H are schematic diagrams showing structures of gate driver units according to one or more embodiments of the present application. FIG. 4 is a schematic diagram showing structure of a gate driver circuit according to one or more embodiments of the present application. The embodiment of the present application provides a gate driver unit including a plurality of gate driver circuits GDC, at least one of which includes a first node control module 101, a first output module 102, an output control module 103, and a second output module 104.

The first node control module 101 is electrically connected to a first node K of the gate driver circuit at the present stage and to a second node P of the gate driver circuit at the present stage, and is configured to transmit a first power supply signal PVGH to the first node K according to an electric potential of the second node P and a corresponding first clock signal XCK, or transmit a second power supply signal NVGL to the first node K according to the potential of the second node P.

The first output module 102 is electrically connected to the first node K of the gate driver circuit at the present stage and the first output terminal Nout of the gate driver circuit at the present stage, and is configured to output the second power supply signal NVGL or the third power supply signal NVGH to the first output terminal Nout according to an electric potential of the first node K.

The output control module 103 is electrically connected to the first node K of the gate driver circuit at the present stage and to the third node Q of the gate driver circuit at the present stage, and the output control module 103 is configured to electrically connect the first node K to the third node Q or to disconnect the electrical connection between the first node K and the third node Q.

The second output module 104 is electrically connected to the second node P of the gate driver circuit at the present stage, the third node Q of the gate driver circuit at the present stage, and the second output terminal Pout (n) of the gate driver circuit at the present stage. The second output module 104 is configured to output a corresponding second clock signal CK or the first power supply signal PVGH to the second output terminal Pout (n) according to the potential of the second node P and the potential of the third node Q.

At least one of the first node control module 101 and the output control module 103 is electrically connected to the second node P of the gate driver circuit at a preceding stage so that at least one of the first node control module 101 and the output control module 103 in the gate driver circuit at the present stage is no longer electrically connected to the first output terminal Nout of a different gate driver circuit at a preceding stage, thereby distinguishing from the gate driver circuit design shown in FIG. 1A by reducing the number of the gate driver circuits corresponding to the first gate control signal Nscan output by the gate driver circuit at the preceding stage from the first output terminal Nout, reducing the load carried by the gate driver circuit at the preceding stage, and ameliorating the problem that the voltage drop of the first gate control signal Nscan output by the gate driver circuit is large.

Optionally, the first node control module 101 of the n-th-stage gate driver circuit GDC(n) is electrically connected to the second node P(n-A) of the (n-A)-th-stage gate driver circuit GDC(n-A) so that the first node control module 101 of the n-th-stage gate driver circuit GDC(n) is configured to transmit the first power supply signal PVGH or the fourth power supply signal PVGL to the first node K according to the potential of the second node P(n-A) of the (n-A)-th-stage gate driver circuit GDC(n-a) and the corresponding first clock signal XCK. By controlling the first node control module 101 of the n-th-stage gate driver circuit GDC(n) by the second node P(n-A) of the (n-A)-th stage gate driver circuit GDC(n-A) rather than by the first gate control signal Nscan(n-A) output from the (n-A)-th-stage gate driver circuit GDC(n-A), and the control of the gate driver circuits at other stages by the first gate control signal Nscan(n-A) output from the (n-A)-th-stage gate driver circuit GDC(n-A) is reduced. In this case, A≥1.

Optionally, the first node control module 101 of the n-th-stage gate driver circuit GDC(n) is electrically connected to the second node P(n−1) of the (n−1)-th-stage gate driver circuit GDC(n−1), and the first node control module 101 of the n-th-stage gate driver circuit GDC(n) is configured to transmit the first power supply signal PVGH or the fourth power supply signal PVGL to the first node K according to the potential of the second node P(n−1) of the (n−1)-th-stage gate driver circuit GDC(n−1) and the corresponding first clock signal XCK.

Optionally, continuing with FIG. 4, the first node control module 101 includes a first transistor T1, a second transistor T2, and a third transistor T3.

The input terminal of the first transistor T1 is configured to receive the first power supply signal PVGH.

The first control terminal and the second control terminal of the second transistor T2 are electrically connected to the control terminal of the first transistor T1, the input terminal of the second transistor T2 is configured to receive the fourth power supply signal PVGL, and the output terminal of the second transistor T2 is electrically connected to the output terminal of the first transistor T1.

The control terminal of the third transistor T3 is configured to receive a corresponding first clock signal XCK, the input terminal of the third transistor T3 is electrically connected to the output terminal of the first transistor T1, and the output terminal of the third transistor T3 is electrically connected to the first node K.

The control terminal of the first transistor T1 of the n-th-stage gate driver circuit GDC(n) is electrically connected to the second node P(n-A) of the (n-A)-th-stage gate driver circuit GDC(n-A) so that the first transistor T1 and the second transistor T2 are controlled by the second node P(n-A) of the (n-A)-th-stage gate driver circuit GDC(n-A).

Optionally, the control terminal of the first transistor T1 of the n-th-stage gate driver circuit GDC(n) is electrically connected to the second node P(n−1) of the (n−1)-th-stage gate driver circuit GDC(n−1) so that the first transistor T1 and the second transistor T2 are turned on or off according to the potential of the second node P(n−1) of the (n−1)-th-stage gate driver circuit GDC(n−1).

With continued reference to FIG. 4, the output control module 103 includes a fourth transistor T4, a fifth transistor T5, and a first capacitor C1.

An input terminal of the fourth transistor T4 is electrically connected to the first node K of the gate driver circuit at the present stage.

The input terminal of the fifth transistor T5 is electrically connected to the output terminal of the fourth transistor T4, and the output terminal of the fifth transistor T5 is electrically connected to the third node Q of the gate driver circuit at the present stage.

The first terminal of the first capacitor C1 is electrically connected to the control terminal of the fourth transistor T4, and the second terminal of the first capacitor C1 is electrically connected to the output terminal of the fourth transistor T4.

The control terminal of at least one of the fourth transistor T4 and the fifth transistor T5 is electrically connected to the second node P of the gate driver circuit at a preceding stage, so that at least one of the fourth transistor T4 and the fifth transistor T5 is no longer controlled by the first gate control signal Nscan output by the gate driver circuit at the preceding stage, thereby reducing the number of gate driver circuits controlled by the first gate control signal Nscan output by the gate driver circuit at the preceding stage from the first output terminal Nout, and ameliorating the problem that the voltage drop of the first gate control signal Nscan output by the gate driver circuit is large.

Optionally, the control terminal of the fourth transistor T4 of the n-th-stage gate driver circuit GDC(n) is electrically connected to the second node P(n-B) of the (n-B)-th-stage gate driver circuit GDC(n-B) so that the fourth transistor T4 of the n-th-stage gate driver circuit GDC(n) is no longer controlled by the first gate control signal Nscan(n-B) output from the (n-B)-th-stage gate driver circuit GDC(n-B), thereby control of the gate driver circuits at other stages by the first gate control signal Nscan(n-B) output from the (n-B)-th-stage gate drives circuit GDC(n-B) is reduced. In this case, B≥1.

Optionally, A<B can be made so that the gate driver circuit at the present stage may output normally.

Optionally, the control terminal of the fourth transistor T4 of the n-th-stage gate driver circuit GDC(n) is electrically connected to the second node P(n−10) of the (n−10)-th-stage gate driver circuit GDC(n−10) so that the fourth transistor T4 is turned on or off according to the potential of the second node P(n−10) of the (n−10)-th-stage gate driver circuit GDC(n−10).

With continued reference to FIG. 4, the control terminal of the fifth transistor T5 of the n-th-stage gate driver circuit GDC(n) is electrically connected to the second node P(n-C) of the (n-C)-th-stage gate driver circuit GDC(n-C) so that the fifth transistor T5 of the n-th-stage gate driver circuit GDC(n) is no longer controlled by the first gate control signal Nscan(n-C) output from the (n-C)-th-stage gate driver circuit GDC(n-C), thereby control of the gate driver circuits at other stages by the first gate control signal Nscan(n-C) output from the (n-C)-th-stage gate driver circuit GDC(n-C) is reduced. In this case, C≥1.

Optionally, to make a pulse width of an active pulse of the second gate control signal Pscan output by the gate driver circuit at the present stage smaller than a pulse width of an active pulse of the first gate control signal Nscan output by the gate driver circuit at the present stage, A<C<B can be made.

Optionally, the control terminal of the fifth transistor T5 of the n-th-stage gate driver circuit GDC(n) is electrically connected to the second node P(n−2) of the (n−2)-th-stage gate driver circuit GDC(n−2) so that the fifth transistor T5 is turned on or off according to the potential of the second node P(n−2) of the (n−2)-th-stage gate driver circuit GDC (n−2).

With continued reference to FIG. 4, the first output module 102 includes a first output transistor To1 and a second output transistor To2.

The control terminal of the first output transistor To1 is electrically connected to the first node K of the gate driver circuit at the present stage, and the input terminal of the first output transistor To1 is configured to receive the second power supply signal NVGL.

The control terminal of the second output transistor To2 is electrically connected to the first node K of the gate driver circuit at the present stage, and the input terminal of the second output transistor To2 is configured to receive the third power supply signal NVGH. The output terminal of the second output transistor To2 and the output terminal of the first output transistor To1 are electrically connected to the first output terminal Nout of the gate driver circuit at the present stage.

With continued reference to FIG. 4, the first node control module 101 includes a sixth transistor T6, a seventh transistor T7, and an eighth transistor T8.

The first control terminal and the second control terminal of the sixth transistor T6 are configured to receive a corresponding first clock signal XCK, and an input terminal of the sixth transistor T6 is electrically connected to the first node K.

The control terminal of the seventh transistor T7 is electrically connected to the second node P of the gate driver circuit at the present stage. The input terminal of the seventh transistor T7 is configured to receive the first power supply signal PVGH, and the output terminal of the seventh transistor T7 is electrically connected to the output terminal of the sixth transistor T6.

The control terminal of the eighth transistor T8 is electrically connected to the second node P of the gate driver circuit at the present stage, the input terminal of the eighth transistor T8 is configured to receive the second power supply signal NVGL, and the output terminal of the eighth transistor T8 is electrically connected to the first node K of the gate driver circuit at the present stage.

With continued reference to FIG. 4, the second output module 104 includes a third output transistor To3, a fourth output transistor To4, and a second capacitor C2.

A control terminal of the third output transistor To3 is electrically connected to the third node Q of the gate driver circuit at the present stage, and an input terminal of the third output transistor To3 is configured to receive a corresponding second clock signal CK.

The control terminal of the fourth output transistor To4 is electrically connected to the second node P of the gate driver circuit at the present stage, the input terminal of the fourth output transistor To4 is configured to receive the first power supply signal PVGH, and the output terminal of the third output transistor To3 and the output terminal of the fourth output transistor To4 are electrically connected to the second output terminal Pout (n) of the gate driver circuit at the present stage.

A first terminal of the second capacitor C2 is electrically connected to a control terminal of the third output transistor To3, and a second terminal of the second capacitor C2 is electrically connected to the output terminal of the third output transistor To3.

With continued reference to FIG. 4, at least one gate driver circuit GDC further includes a second node control module 105 including a ninth transistor T9 and a tenth transistor T10.

The control terminal of the ninth transistor T9 is electrically connected to the first node K of the gate driver circuit at the present stage, the input terminal of the ninth transistor T9 is configured to receive the first power supply signal PVGH, and the output terminal of the ninth transistor T9 is electrically connected to the second node P of the gate driver circuit at the present stage.

The control terminal of the tenth transistor T10 is electrically connected to the first node K of the gate driver circuit at the present stage, the input terminal of the tenth transistor T10 is configured to receive the fourth power supply signal PVGL, and the output terminal of the tenth transistor T10 is electrically connected to the second node P of the gate driver circuit at the present stage.

It will be appreciated that the control terminal of the first transistor of the first-stage gate driver circuit in the multi-stage gate driver units is configured to receive the enable signal stv. The control terminal of the fourth transistor is configured to receive the corresponding control signal to remain an ON state (if the fourth transistor is a P-type transistor, a low level signal VGL is received). The control terminal of the fifth transistor is configured to receive the corresponding control signal to remain an ON state. In this case, STV in FIG. 3B-FIG. 3H corresponds to the control terminal of the first transistor, RST1 corresponds to the control terminal of the fourth transistor, and RST2 corresponds to the control terminal of the fifth transistor.

Since the potential of the first gate control signal Nscan and the potential of the second node P are each generated by the potential of the first node K through an inverter (i.e., the ninth transistor T9 and the tenth transistor T10, the first output transistor To1 and the second output transistor To2), the potential change of the second node P is the same as that of the first gate control signal Nscan. Therefore, the potential of the second node P(n-A) of the (n-A)-th-stage gate driver circuit GDC(n-A), instead of the first gate control signal Nscan(n-A) output by the (n-A)-th-stage gate driver circuit GDC(n-A), may control the turn-on or turn-off of the first transistor T1 and the second transistor T2 of the n-th-stage gate driver circuit GDC(n); the potential of the second node P(n-B) of the (n-B)-th-stage gate driver circuit GDC(n-B), instead of the first gate control signal Nscan(n-B) output by the (n-B)-th-stage gate driver circuit GDC(n-B), may control the turn-on or turn-off of the fourth transistor T4 of the n-th-stage gate driver circuit GDC(n); the potential of the second node P(n-C) of the (n-C)-th-stage gate driver circuit GDC(n-C), instead of the first gate control signal Nscan(n-C) output by the (n-C)-th-stage gate driver circuit GDC(n-C), may control the turn-on or turn-off of the fifth transistor T5 of the n-th-stage gate driver circuit GDC(n), thereby the control of the gate driver circuits at other stages by the first gate control signal Nscan output by each gate driver circuit may be reduced without changing the output principle of the gate driver circuits, thereby ameliorating the problem of voltage drop of the first gate control signal Nscan.

Since the output high level of the first gate control signal Nscan is generated from the third power supply signal NVGH, during the stage transmission process of the multi-stage gate driver circuits in the gate driver unit adopting the gate driver circuit shown in FIG. 1A, the third power supply signal NVGH needs to participate in the operation of the gate driver circuits of three stages at the same time, the voltage drop generated by the third power supply signal NVGH is large, so that the voltage drop of the first gate control signal Nscan is also large. Accordingly, through additional transmission paths transmitting the second power supply signals NVGL and the third power supply signals NVGH, the first output modules 102 of the multi-stage gate driver circuits may receive the corresponding second power supply signals NVGL and the third power supply signals NVGH through different power lines (as shown in FIG. 3B-3H), instead of receiving the corresponding second power supply signals NVGL through the same power line and receiving the corresponding third power supply signal NVGH through the same power line (as shown in FIG. 3H), so as to reduce the load carried by the second power supply signal NVGL or the third power supply signal NVGH transmitted through one power line, thereby ameliorating the problem of voltage drop of the first gate control signal Nscan. At the same time, the period of the pull-down coupling of the first gate control signal Nscan may be lengthened to reduce an influence of the matching of the first gate control signal Nscan and the second gate control signal Pscan.

Figure 3A:
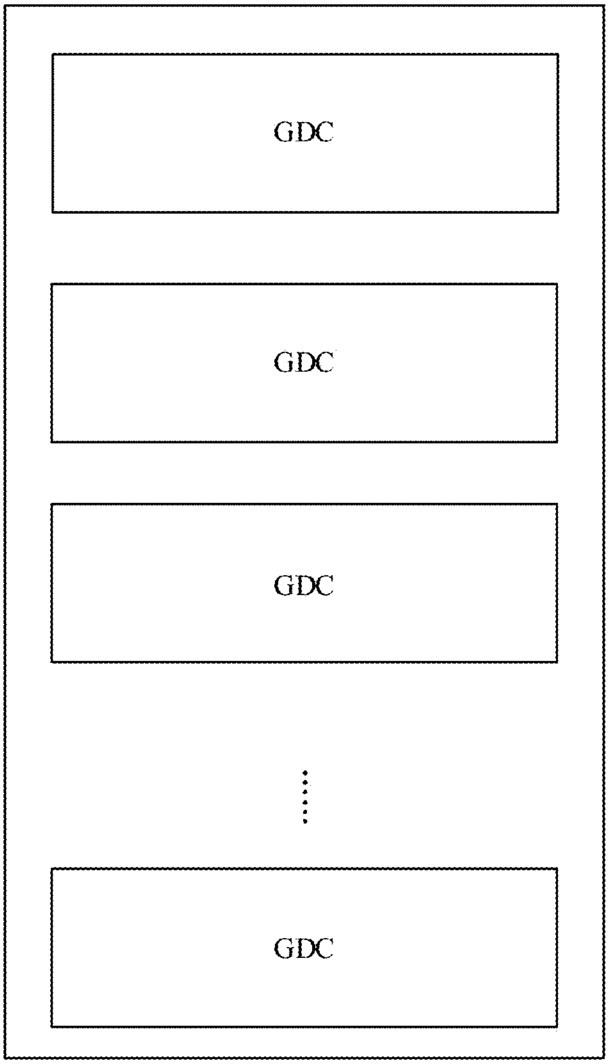
FIGS. 3A-3H are schematic diagram showing structures of gate driver units according to one or more embodiments of the present application.
Figure 3B:
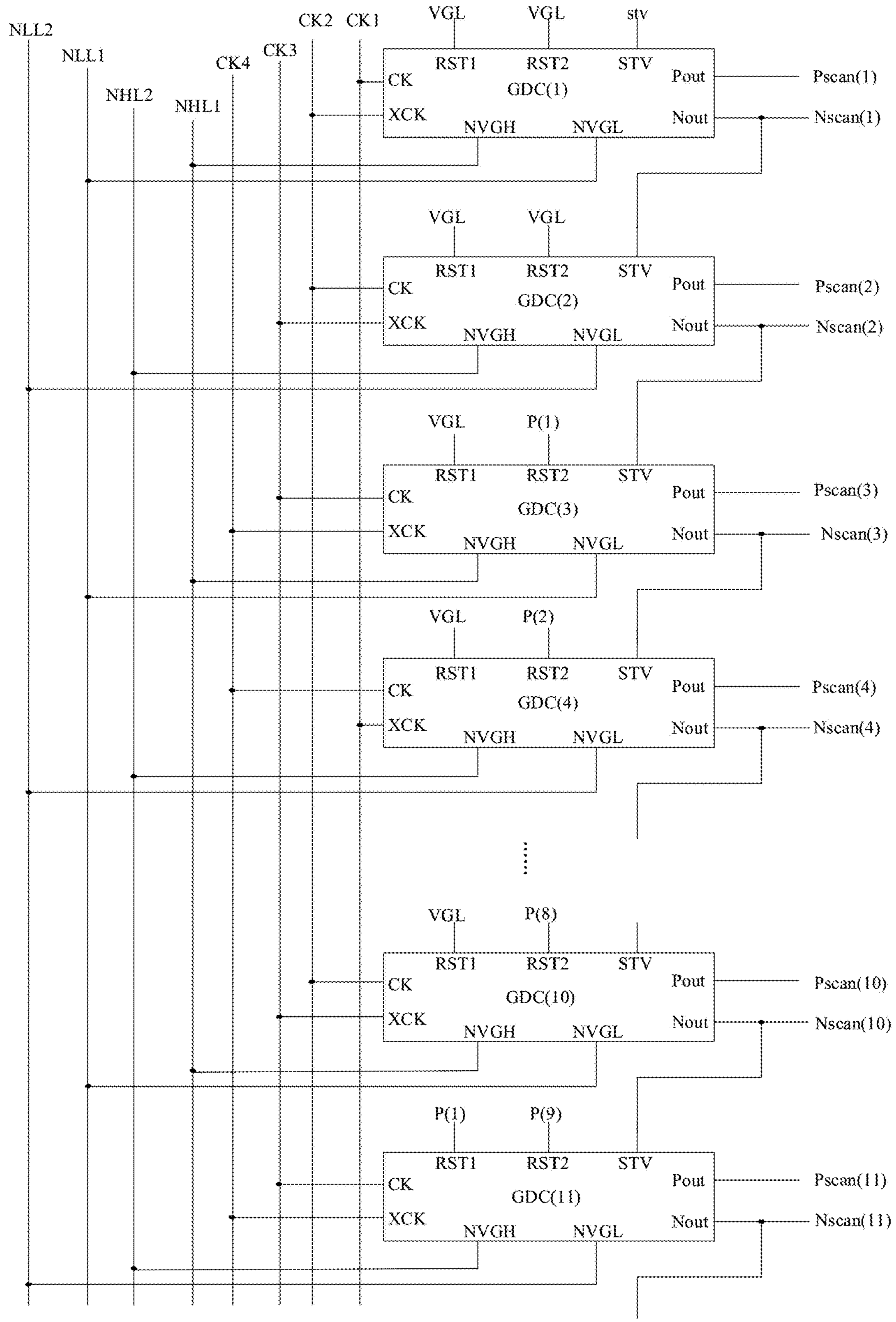
Figure 3C:
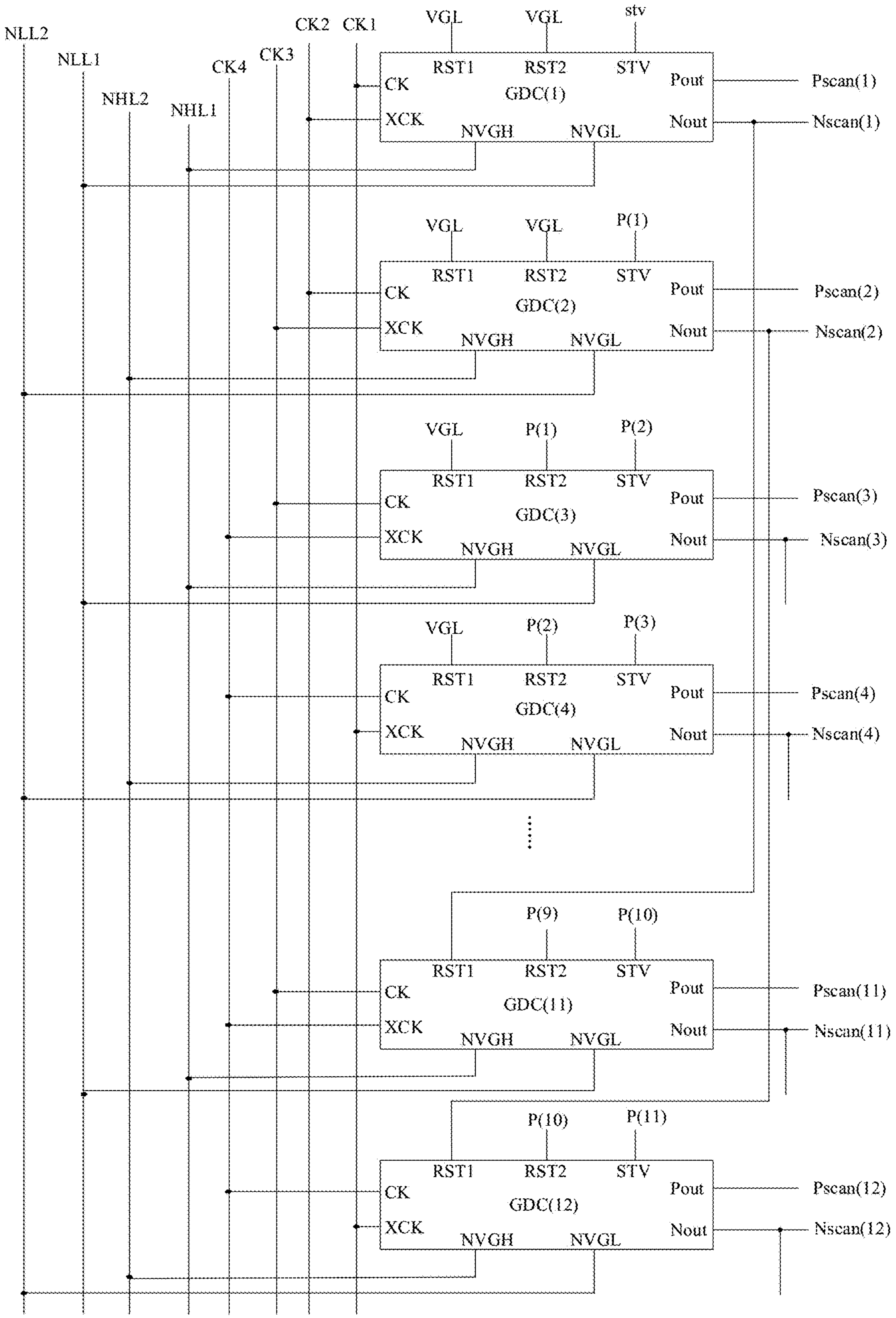
Figure 3D:
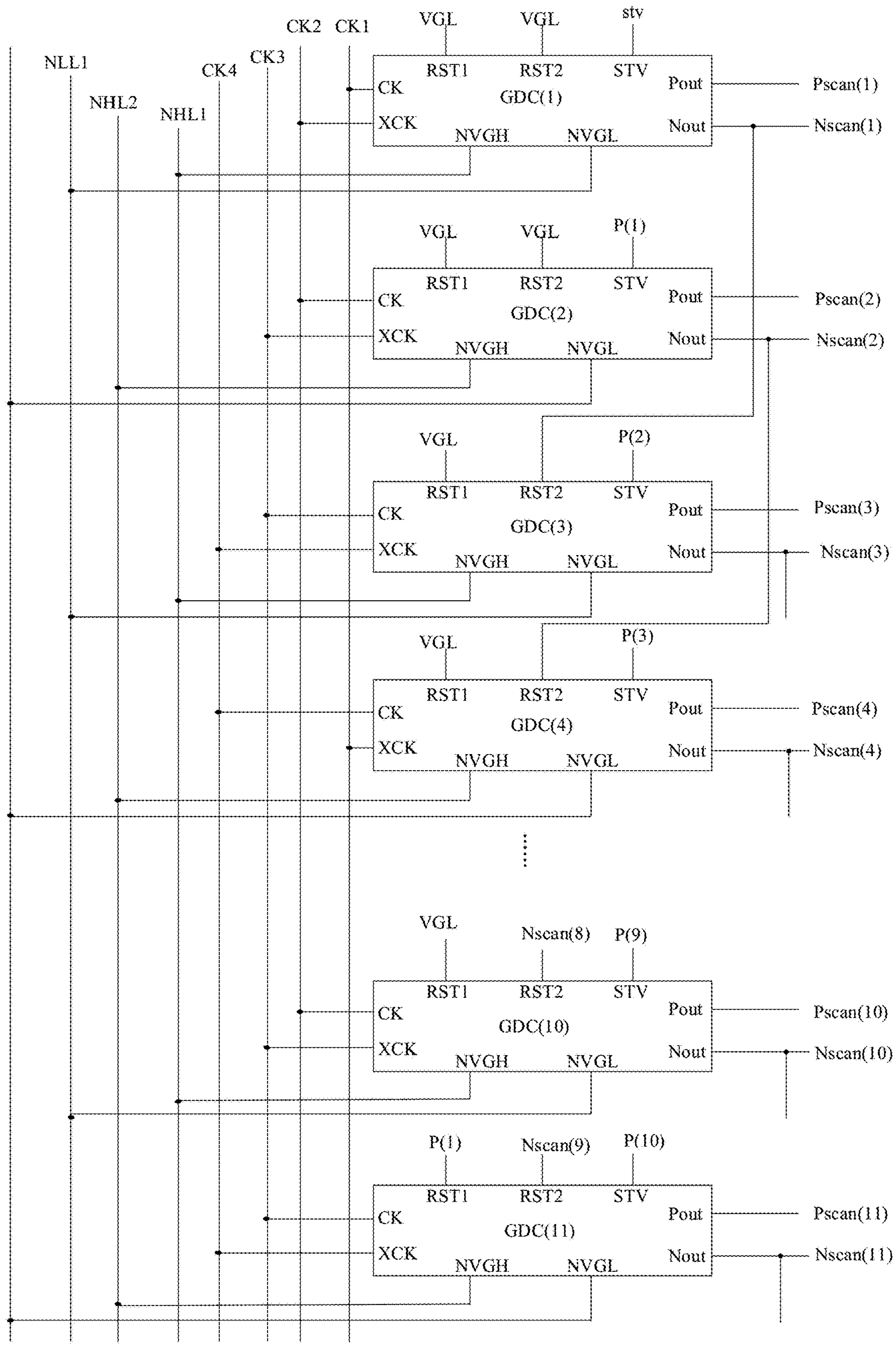
Figure 4:
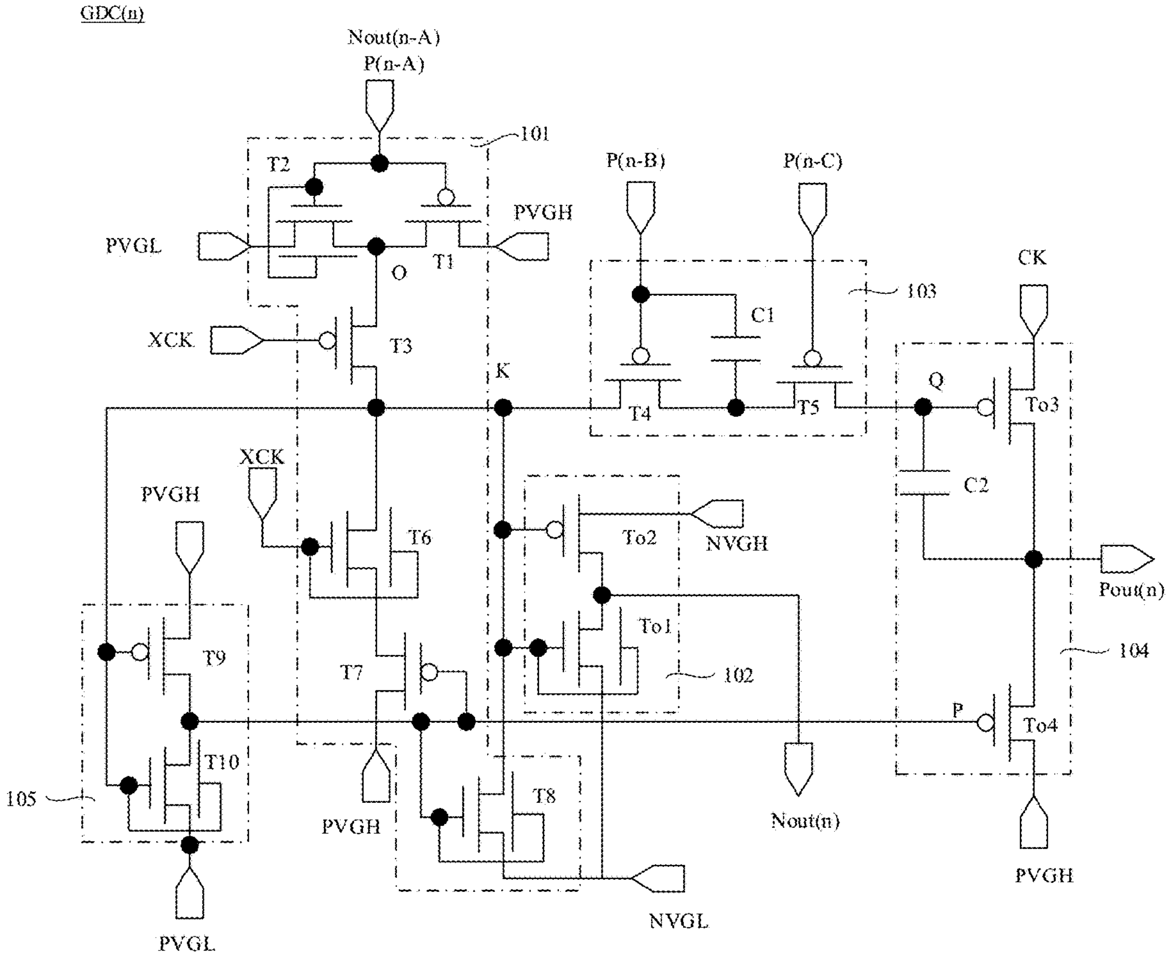
FIG. 4 is a schematic diagram showing structure of a gate driver circuit according to one or more embodiments of the present application.

With continued reference to FIGS. 3B-3D, the input terminals of the first output transistors To1 of gate driver circuits at stages of odd numbers (e.g., GDC(1), GDC(3), . . . , referred to as odd-number-stage gate driver circuits hereafter) are electrically connected to the first sub-power supply line NLL1 transmitting the second power supply signal NVGL; the input terminals of the second output transistors To2 of the odd-number-stage gate driver circuits are electrically connected to the second sub-power supply line NHL1 transmitting the third power supply signal NVGH; the input terminals of the first output transistors To1 of gate driver circuits of stages of even numbers (e.g., GDC(2), GDC(4), . . . , referred to as even-number-stage gate driver circuits) are electrically connected to the third sub-power supply line NLL2 for transmitting the second power supply signal NVGL; and the input terminals of the second output transistors To2 of the even-number-stage gate driver circuits are electrically connected to the fourth sub-power supply line NHL2 for transmitting the third power supply signal NVGH, so that the gate driver circuits at two adjacent stages receive the corresponding second power supply signal NVGL and the third power supply signal NVGH through the different power supply lines, thereby lengthening the period in which the voltage drop problem occurs in the first gate control signal Nscan. Further, by overlapping the portion of the first gate control signal Nscan not suffering from the voltage drop with the second gate control signal Pscan, normal writing of the data signal can be realized when the display panel applying the gate driver unit receives the corresponding first gate control signal Nscan and the second gate control signal Pscan, thereby ameliorating the problem of display unevenness in the display panel.

FIG. 3B shows a cascade arrangement of a plurality of gate driver circuits when the first gate control signal Nscan (n−1) output by the (n−1)-th-stage gate driver circuit GDC (n−1) is output to the control terminal of the first transistor T1 of the n-th-stage gate driver circuit GDC(n), the second node P(n−10) of the (n−10)-th-stage gate driver circuit GDC(n−10) is electrically connected to the control terminal of the fourth transistor T4 of the n-th-stage gate driver circuit GDC(n), and the second node P(n−2) of the (n−2)-th-stage gate driver circuit GDC(n−2) is electrically connected to the control terminal of the fifth transistor T5 of the n-th-stage gate driver circuit GDC(n).

FIG. 3C shows a cascade arrangement of a plurality of gate driver circuits when a second node P(n−1) of the (n−1)-th-stage gate driver circuit GDC(n−1) is electrically connected to a control terminal of a first transistor T1 of the n-th-stage gate driver circuit GDC(n), a first gate control signal Nscan(n−10) output from the (n−10)-th-stage gate driver circuit GDC(n−10) is output to a control terminal of a fourth transistor T4 of the n-th-stage gate driver circuit GDC(n), and a second node P(n−2) of the (n−2)-th-stage gate driver circuit GDC(n−2) is electrically connected to a control terminal of a fifth transistor T5 of the n-th-stage gate driver circuit GDC(n).

FIG. 3D shows a cascade arrangement of a plurality of gate driver circuits when a second node P(n−1) of the (n−1)-th-stage gate driver circuit GDC(n−1) is electrically connected to the control terminal of the first transistor T1 of the n-th-stage gate driver circuit GDC(n), a second node P(n−10) of the (n−10)-th-stage gate driver circuit GDC(n−10) is electrically connected to the control terminal of the fourth transistor T4 of the n-th-stage gate driver circuit GDC(n), and a first gate control signal Nscan(n−2) output from the (n−2)-th-stage gate driver circuit GDC(n−2) is output to the control terminal of the fifth transistor T5 of the n-th-stage gate driver circuit GDC(n).

Optionally, in cases where the first gate control signal Nscan output from each stage of gate driver circuit is received by only one stage of gate driver circuit (such as the cascade arrangements as shown in any one of FIGS. 3B-3D), it is possible to provide the first sub-power supply line NLL1-the fourth sub-power supply line NHL2, through which the gate driver circuits of two adjacent stages receive the corresponding second power supply signal NVGL and the third power supply signal NVGH through different power supply lines, so that the voltage drop problem of the first gate control signal Nscan can be ameliorated while the loads of the multi-stage gate driver circuits are uniform without a long-period regularity change.

Optionally, with continued reference to FIG. 3H, the first sub-power supply line NLL1 and the third sub-power supply line NLL2 are electrically connected to the first power supply bus NLB so as to generate the second power supply signal NVGL through a same power supply management chip and the like, so as to keep the second power supply signals NVGL received by the gate driver circuits of each stages synchronized while reducing the control complexity.

Optionally, the second sub-power supply line NHL1 and the fourth sub-power supply line NHL2 are electrically connected to the second power supply bus NHB so as to generate the third power supply signal NVGH through a same power supply management chip and the like, so as to keep the third power supply signals NVGH received by the gate driver circuits of each stages synchronized while reducing the control complexity.

Optionally, the gate driver circuits of three adjacent stages may receive the corresponding second power supply signals NVGL and the third power supply signals NVGH through different power lines to ameliorate the voltage drop problem of the first gate control signals Nscan, so that the loads regularity of the multi-stage gate driver circuits is uniform.

Figure 3E:
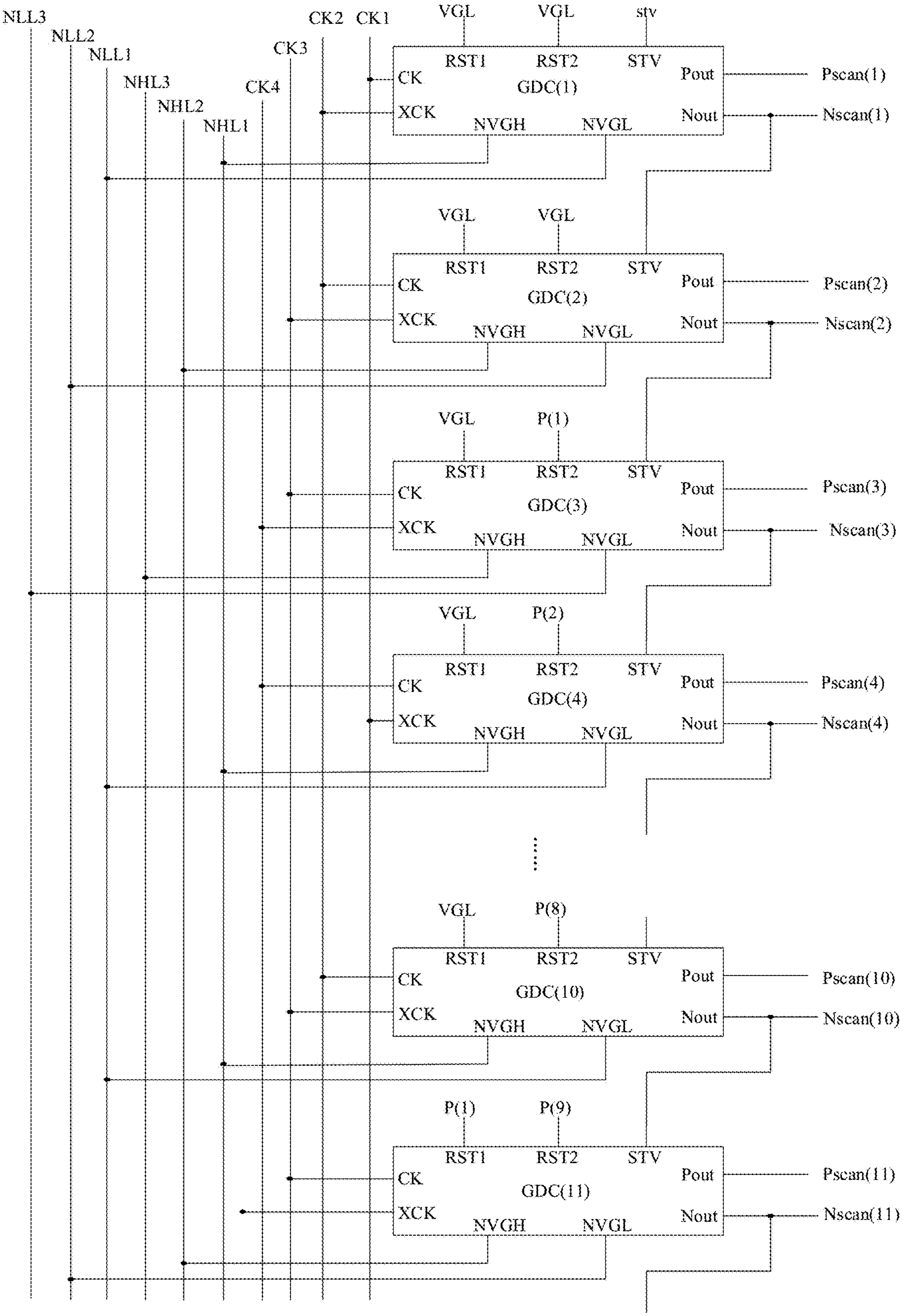
Figure 3F:
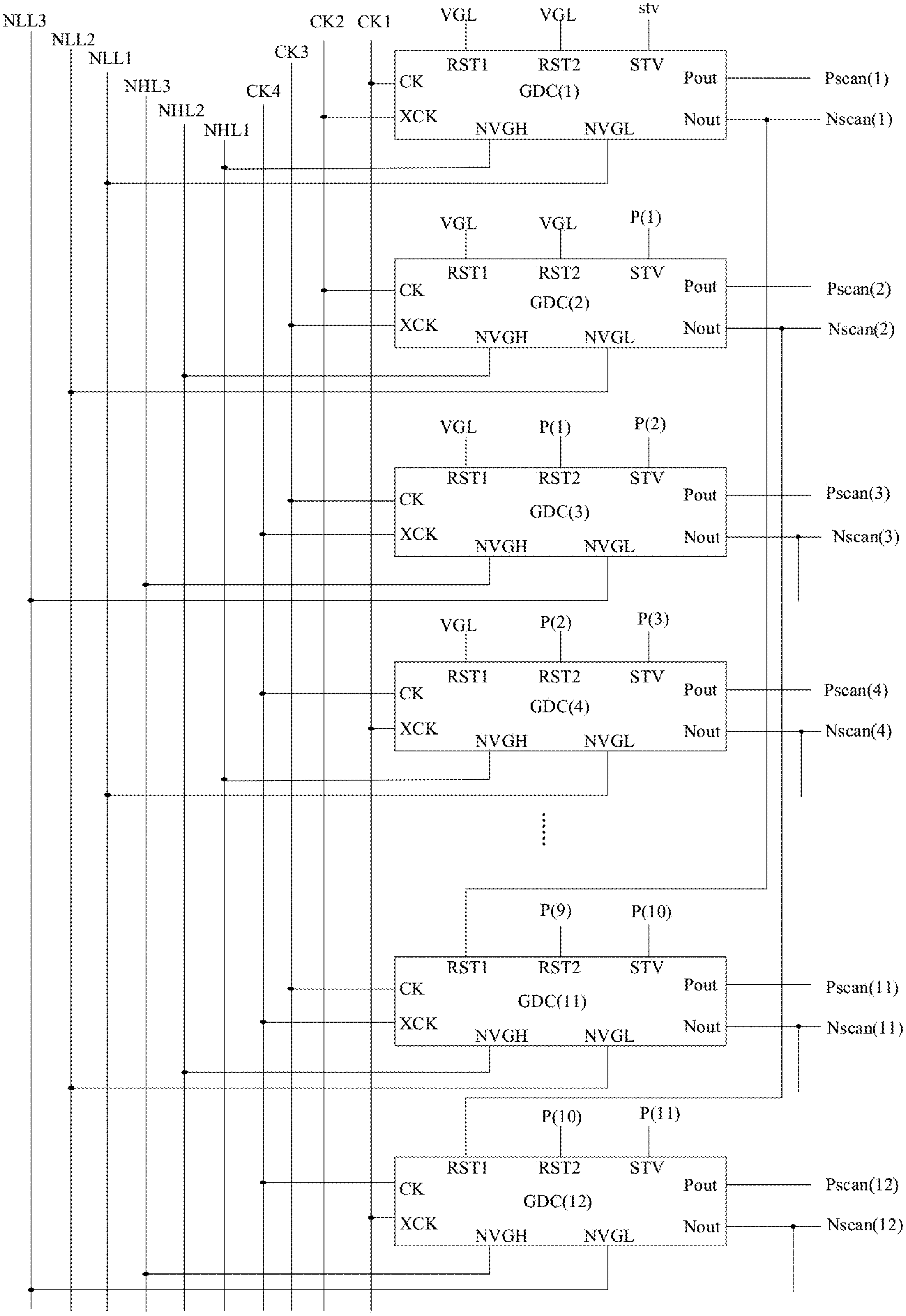
Figure 3G:
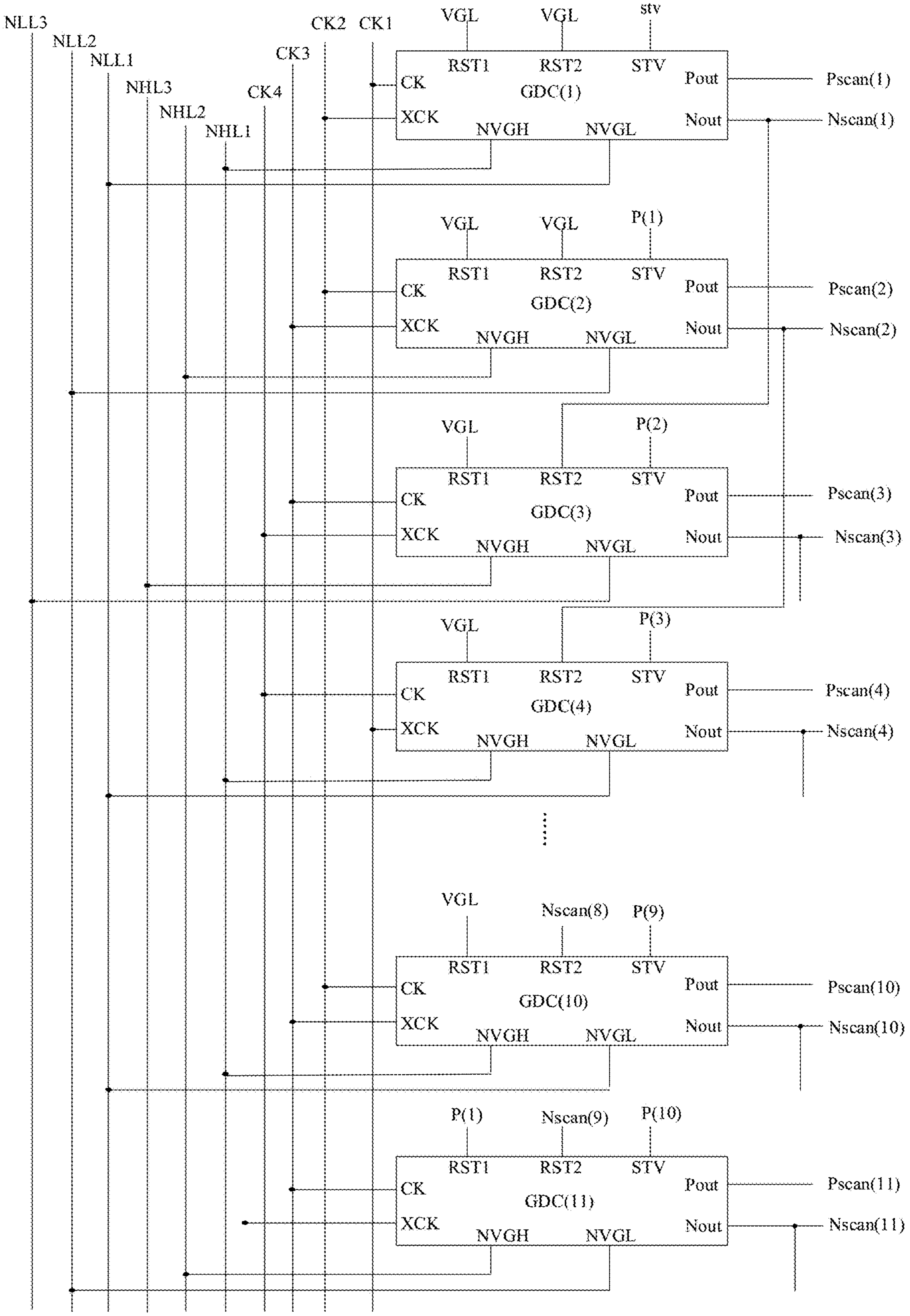
Figure 3H:
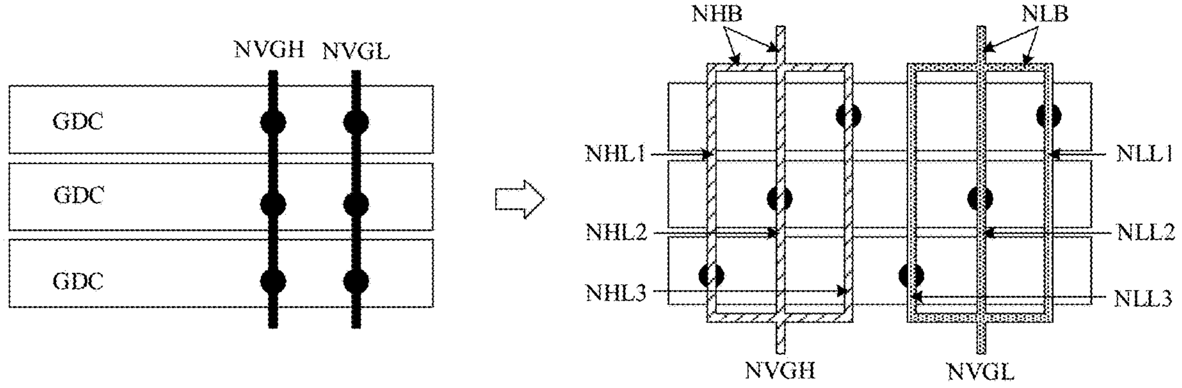

With continued reference to FIG. 3E-3G, the input terminal of the first output transistor To1 of the (1+3m)-th-stage gate driver circuit is electrically connected to the first sub-power supply line NLL1 transmitting the second power supply signal NVGL. The input terminal of the second output transistor To2 of the (1+3m)-th-stage gate driver circuit is electrically connected to the second sub-power supply line NHL1 transmitting the third power supply signal NVGH. The input terminal of the first output transistor To1 of the (2+3m)-th-stage gate driver circuit is electrically connected to the third sub-power supply line NLL2 transmitting the second power supply signal NVGL. The input terminal of the second output transistor To2 of the (2+3m)-th-stage gate driver circuit is electrically connected to the fourth sub-power supply line NHL2 transmitting the third power supply signal NVGH. The input terminal of the first output transistor To1 of the (3+3m)-th-stage gate driver circuit is electrically connected to the fifth sub-power supply line NLL3 for transmitting the second power supply signal NVGL. And the input terminal of the second output transistor To2 of the (3+3m)-th-stage gate driver circuit is electrically connected to the sixth sub-power supply line NHL3 for transmitting the third power supply signal NVGH. Thereby, the gate driver circuits of three adjacent stages receive the corresponding second power supply signals NVGL and the third power supply signals NVGH through the different power supply lines, so that the portion of the first gate control signal Nscan not suffering from a voltage drop overlaps with the second gate control signal Pscan, thereby ameliorating the display unevenness problem occurring in the display panel applying the gate driver unit. In this case, m≥0.

Optionally, in cases where the first gate control signal Nscan output by each stage of gate driver circuit is received only by one stage of gate driver circuit (such as the cascade arrangements as shown in any one of FIGS. 3E-3G), it is possible to provide the first sub-power supply line NLL1-the sixth sub-power supply line NHL3, through which the gate driver circuits of three adjacent stages receive the corresponding second power supply signals NVGL and the third power supply signals NVGH through different power supply lines.

Optionally, the first gate control signal Nscan output from each stage of gate driver circuit is received by only two stages of gate driver circuit (for example, the first gate control signal Nscan(n-A) output from the (n-A)-th stage gate driver circuit GDC(n-A) is output to the control terminal of the first transistor T1 of the n-th-stage gate driver circuit GDC(n), the first gate control signal Nscan(n-B) output from the (n-B)-th stage gate driver circuit GDC(n-B) is output to the control terminal of the fourth transistor T4 of the n-th-stage gate driver circuit GDC(n), and the second node P(n-C) of the (n-C)-th stage gate driver circuit GDC (n-C) is electrically connected to the control terminal of the fifth transistor T5 of the n-th-stage gate driver circuit GDC (n); or, the first gate control signal Nscan(n-A) output from the (n-A)-th-stage gate driver circuit GDC(n-A) is output to the control terminal of the first transistor T1 of the n-th-stage gate driver circuit GDC(n), the first gate control signal Nscan(n-B) output from the (n-B)-th-stage gate driver circuit GDC(n-B) is output to the control terminal of the fourth transistor T4 of the n-th-stage gate driver circuit GDC(n), and the first gate control signal Nscan(n-C) output from the (n-C)-th-stage gate driver circuit GDC(n-C) is output to the control terminal of the fifth transistor T5 of the n-th-stage gate driver circuit GDC(n); or, the second node P(n-A) of the (n-A)-th stage gate driver circuit GDC(n-A) is electrically connected to the control terminal of the first transistor T1 of the n-th-stage gate driver circuit GDC(n), the first gate control signal Nscan(n-B) output from the (n-B)-th stage gate driver circuit GDC(n-B) is output to the control terminal of the fourth transistor T4 of the n-th-stage gate driver circuit GDC(n), and the first gate control signal Nscan(n-C) output from the (n-C)-th stage gate driver circuit GDC(n-C) is output to the control terminal of the fifth transistor T5 of the n-th-stage gate driver circuit GDC(n)), it is possible to provide the first sub-power supply line NLL1-the sixth sub-power supply line NHL3, through which the gate driver circuits of three adjacent stages receive the corresponding second power supply signals NVGL and the third power supply signals NVGH through different power supply lines.

Optionally, with continued reference to FIG. 3H, the first sub-power supply line NLL1, the third sub-power supply line NLL2, and the fifth sub-power supply line NLL3 are electrically connected to the first power supply line NLB. The second sub-power supply line NHL1, the fourth sub-power supply line NHL2, and the sixth sub-power supply line NHL3 are electrically connected to the second power supply bus NHB.

Optionally, it is also possible to reduce the voltage drops of the second power supply signal NVGL and the third power supply signal NVGH by reducing the resistances of the traces for transmitting the second power supply signal NVGL and the third power supply signal NVGH, thereby ameliorating the problem of the voltage drop of the first gate control signal Nscan.

For example, the square resistance of the first power supply bus NLB is smaller than the square resistance of the first sub-power supply line NLL1, and the square resistance of the first power supply bus NLB is smaller than the square resistance of the third sub-power supply line NLL2.

Similarly, the square resistance of the second power supply bus NHB is smaller than that of the second sub-power supply line NHL1, and the square resistance of the second power supply bus NHB is smaller than that of the fourth sub-power supply line NHL2.

Optionally, the trace width of the first power supply bus NLB may be made larger than that of the first sub-power supply line NLL1 and of the third sub-power supply line NLL2, so that the square resistance of the first power supply bus NLB is smaller than that of the first sub-power supply line NLL1 and of the third sub-power supply line NLL2. The square resistance of the first power supply bus NLB may also be adjusted by setting the first power supply bus NLB as a multi-layer trace so that the square resistance of the first power supply bus NLB is smaller than that of the first sub-power supply line NLL1 and of the third sub-power supply line NLL2.

Similarly, the trace width of the second power supply bus NHB may be made larger than that of the second sub-power supply line NHL1 and of the fourth sub-power supply line NHL2, so that the square resistance of the second power supply bus NHB is smaller than that of the second sub-power supply line NHL1 and of the fourth sub-power supply line NHL2. The square resistance of the second power supply bus NHB may also be adjusted by setting the second power supply bus NHB as a multi-layer trace so that the square resistance of the second power supply bus NHB is smaller than that of the second sub-power supply line NHL1 and of the fourth sub-power supply line NHL2.

Since the voltage drops of the second power supply signal NVGL and the third power supply signal NVGH are related both to a driving capability, and to the parasitic capacitances of the first output transistor To1 and the second output transistor To2. Thus, the pull-down effect on the first gate control signal Nscan can be reduced by adjusting the parameters of the first output transistor To1 and the second output transistor To2.

Optionally, the channel width of the first output transistor To1 may be reduced to reduce the pull-down effect of the second power supply signal NVGL on the first gate control signal Nscan. The channel width of the second output transistor To2 may be reduced to reduce the pull-down effect of the voltage drop of the third power supply signal NVGH on the first gate control signal Nscan.

Optionally, the channel width of the first output transistor To1 is less than 288 microns, and the channel width of the second output transistor To2 is less than 186 microns, so that the channel widths of the first output transistor To1 and the second output transistor To2 are less than those in existing designs, thereby reducing the pull-down effect of the voltage drops of the second power supply signal NVGL and the third power supply signal NVGH on the first gate control signal Nscan.

It will be appreciated that the channel widths of the first output transistor To1 and the second output transistor To2 may be different for display panels of different sizes and different properties. Therefore, the channel widths of the first output transistor To1 and the second output transistor To2 can be adjusted according to actual requirements.

With continued reference to FIGS. 3B-3H, the multi-stage gate driver circuits may share four clock signals (i.e., CK1, CK2, CK3, and CK4), and each gate driver circuit applies two of the four clock signals as a first clock signal XCK and a second clock signal CK, respectively. The adjacent two gate driver units share one clock signal, and the clock signal shared by the adjacent two gate driver units serves as the second clock signal CK of the gate driver circuit at a subsequent stage and as the first clock signal XCK of the gate driver circuit at a preceding stage. Take the first-stage gate driver circuit to the fifth-stage gate driver circuit as an example, the first one of the clock signals CK1 is used as the second clock signal CK of the first-stage gate driver circuit, the second one of the clock signals CK2 is used as the first clock signal XCK of the first-stage gate driver circuit, and the second one of the clock signals CK2 is used as the second clock signal CK of the second-stage gate driver circuit; the third one of the clock signals CK3 is used as the first clock signal XCK of the second-stage gate driver circuit, and the third one of the clock signals CK3 is used as the second clock signal CK of the third-stage gate drivee circuit; the fourth one of the clock signals CK4 is used as the first clock signal XCK of the third-stage gate driver circuit, and the fourth one of the clock signals CK4 is used as the second clock signal CK of the fourth-stage gate driver circuit; the first one of the clock signals CK1 is used as the first clock signal XCK of the fourth-stage gate driver circuit, and the first one of the clock signals CK1 is used as the second clock signal CK of the fifth-stage gate driver circuit, and the second one of the clock signals CK2 is used as the first clock signal XCK of the fifth-stage gate driver circuit, so that the first-stage gate driver circuit and the fifth-stage gate driver circuit use the same clock signal, and so on. Thereby, the clock signals used by the gate driver circuits of other stages may be obtained.

FIGS. 5A-5D are timing diagrams corresponding to the gate driver circuit shown in FIG. 4, in which the first transistor T1-the tenth transistor T10 and the first output transistor To1-the fourth output transistor To4 are N-type transistors, the control terminal of the first transistor T1 of the n-th-stage gate driver circuit GDC(n) is controlled by the first gate control signal Nscan(n−1) output from the (n−1)-th-stage gate driver circuit GDC(n−1), the control terminal of the fourth transistor T4 of the n-th-stage gate driver circuit GDC(n) is controlled by the second node P(n−10) of the (n−10)-th-stage gate driver circuit GDC(n−10), the control terminal of the fifth transistor T5 of the n-th-stage gate driver circuit GDC(n) is controlled by the second node P(n−2) of the (n−2)-th-stage gate driver circuit GDC(n−2), the n-th-stage gate driver circuit GDC(n) corresponds to the first one of the clock signals CK1 as the second clock signal CK, and the n-th-stage gate driver circuit GDC(n) corresponds to the second one of the clock signals CK1 as the first clock signal XCK. And the operation principle of the n-th-stage gate driver circuit GDC(n) is to be briefly described.

In the first stage t1, the first clock signal XCK is at a low level, the second clock signal CK is at a high level, the second node P(n−10) of the (n−10)-th stage gate driver circuit GDC(n−10) is at a high level, the second node P(n−2) of the (n−2)-th-stage gate driver circuit GDC(n−2) is at a low level, and the first gate control signal Nscan(n−1) output by the (n−1)-th-stage gate driver circuit GDC(n−1) is at a low level.

The first transistor T1, the third transistor T3, the fifth transistor T5 and the sixth transistor T6 of the n-th-stage gate driver circuit GDC(n) are turned on, the first power supply signal PVGH is transmitted to the first node K (n), the tenth transistor T10 and the first output transistor To1 are turned on, the second power supply signal NVGL is transmitted to the first output terminal Nout (n), the fourth power supply signal PVGL is transmitted to the second node P(n), the seventh transistor T7 and the fourth output transistor To4 are turned on, and the first power supply signal PVGH is transmitted to the second output terminal Pout (n).

In the second stage t2, the first clock signal XCK is at a high level, the second clock signal CK is at a low level, the second node P(n−10) of the (n−10)-th-stage gate driver circuit GDC(n−10) is at a low level, the second node P(n−2) of the (n−2)-th-stage gate driver circuit GDC(n−2) is at a high level, and the first gate control signal Nscan(n−1) output by the (n−1)-th-stage gate driver circuit GDC(n−1) is at a high level.

The second transistor T2 of the n-th-stage gate driver circuit GDC(n) is turned on, and the fourth power supply signal PVGL is transmitted to the output terminal (i.e., at point O) of the first transistor T1. Since the third transistor T3 is turned off, the second power supply signal NVGL is still transmitted to the first output terminal Nout (n), and the first power supply signal PVGH is still transmitted to the second output terminal Pout (n).

In the third stage t3, the first clock signal XCK is at a low level, the second clock signal CK is at a high level, the second node P(n−10) of the (n−10)-th-stage gate driver circuit GDC(n−10) is at a low level, the second node P(n−2) of the (n−2)-th-stage gate driver circuit GDC(n−2) is at a high level, and the first gate control signal Nscan(n−1) output by the (n−1)-th-stage gate driver circuit GDC(n−1) is at a high level.

The second transistor T2, the third transistor T3, the fourth transistor T4 and the sixth transistor T6 of the n-th-stage gate driver circuit GDC(n) are turned on. The fourth power supply signal PVGL is transmitted to the first node K (n). The ninth transistor T9 and the second output transistor To2 are turned on. The first power supply signal PVGH is transmitted to the second node P(n). The eighth transistor T8 is turned on, the first output transistor To1 is turned off, and the third power supply signal NVGH is transmitted to the first output terminal Nout (n). Since the fifth transistor T5 is turned off, the output state of the second output terminal Pout (n) is the same as that in the previous stage.

In the fourth stage t4, the first clock signal XCK and the second clock signal CK are at high levels, the second node P(n−10) of the (n−10)-th-stage gate driver circuit GDC(n−10) is at a low level, the second node P(n−2) of the (n−2)-th-stage gate driver circuit GDC(n−2) is at a low level, and the first gate control signal Nscan(n−1) output by the (n−1)-th-stage gate driver circuit GDC(n−1) is at a high level.

The fifth transistor T5 of the n-th-stage gate driver circuit GDC(n) is turned on, the first node K (n) is electrically connected to the control terminal of the third transistor T3, the third transistor T3 is turned on, and the second clock signal CK is transmitted to the second output terminal Pout (n).

In the fifth stage t5, the first clock signal XCK is at a high level, the second clock signal CK is at a low level. the second node P(n−10) of the (n−10)-th-stage gate driver circuit GDC(n−10) is at a low level, the second node P(n−2) of the (n−2)-th-stage gate driver circuit GDC(n−2) is at a low level, and the first gate control signal Nscan(n−1) output by the (n−1)-th-stage gate driver circuit GDC(n−1) is at a low level.

The first transistor T1 of the n-th-stage gate driver circuit GDC(n) is turned on, and the first power supply signal PVGH is transmitted to the output terminal of the first transistor T1. Since the third transistor T3 is turned off, the second clock signal CK is still transmitted to the second output terminal Pout (n) so that the second gate control signal Pscan (n) output from the second output terminal Pout (n) is at a low level.

In the sixth stage t6, the first clock signal XCK is at a low level, the second clock signal CK is at a high level, the second node P(n−10) of the (n−10)-th-stage gate driver circuit GDC(n−10) is at a low level, the second node P(n−2) of the (n−2)-th-stage gate driver circuit GDC(n−2) is at a low level, And the first gate control signal Nscan(n−1) output by the (n−1)-th-stage gate driver circuit GDC(n−1) is at a low level.

The first transistor T1, the third transistor T3, the fifth transistor T5 and the sixth transistor T6 of the n-th-stage gate driver circuit GDC(n) are turned on. The first power supply signal PVGH is transmitted to the first node K (n). The tenth transistor T10 and the first output transistor To1 are turned on. The second power supply signal NVGL is transmitted to the first output terminal Nout (n), and the fourth power supply signal PVGL is transmitted to the second node P(n). The seventh transistor T7 and the fourth output transistor To4 are turned on, and the first power supply signal PVGH is transmitted to the second output terminal Pout (n).

Figure 5A:
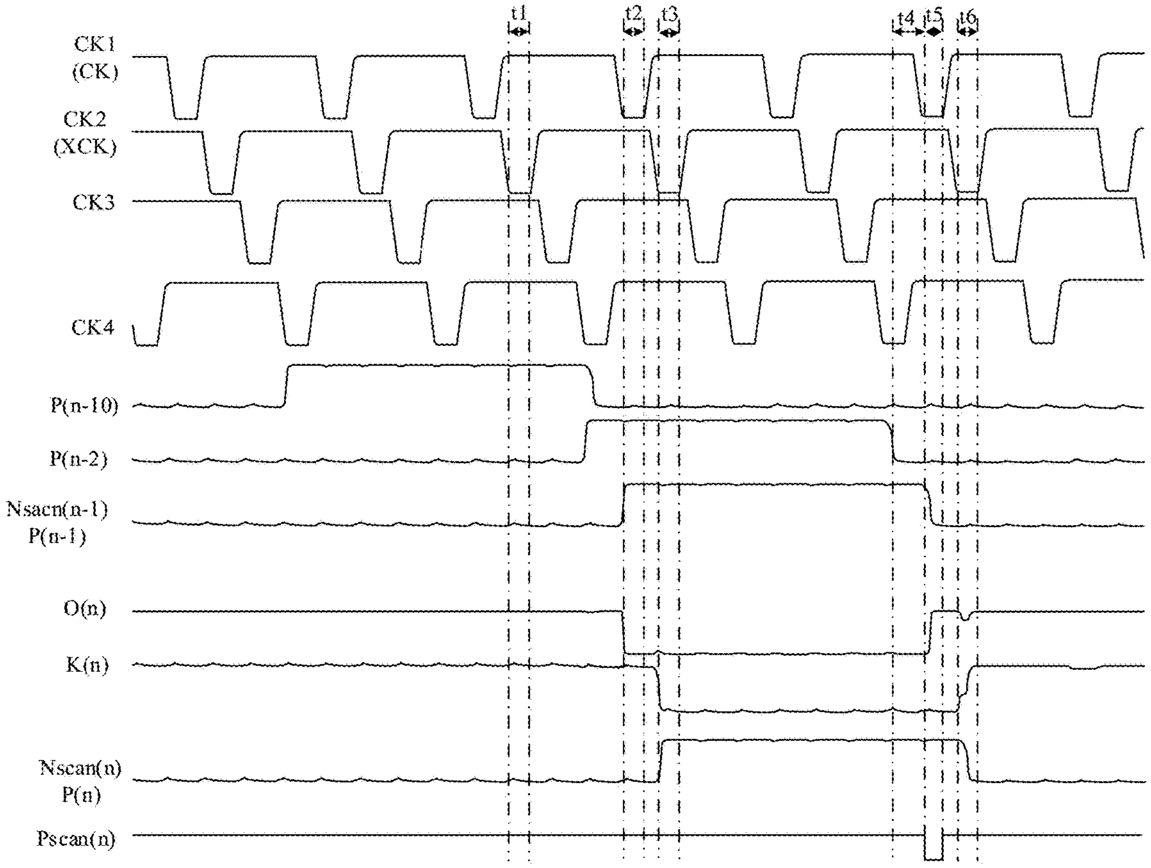
FIGS. 5A-5D are timing diagrams corresponding to the gate driver circuit shown in FIG. 4.
Figure 5B:
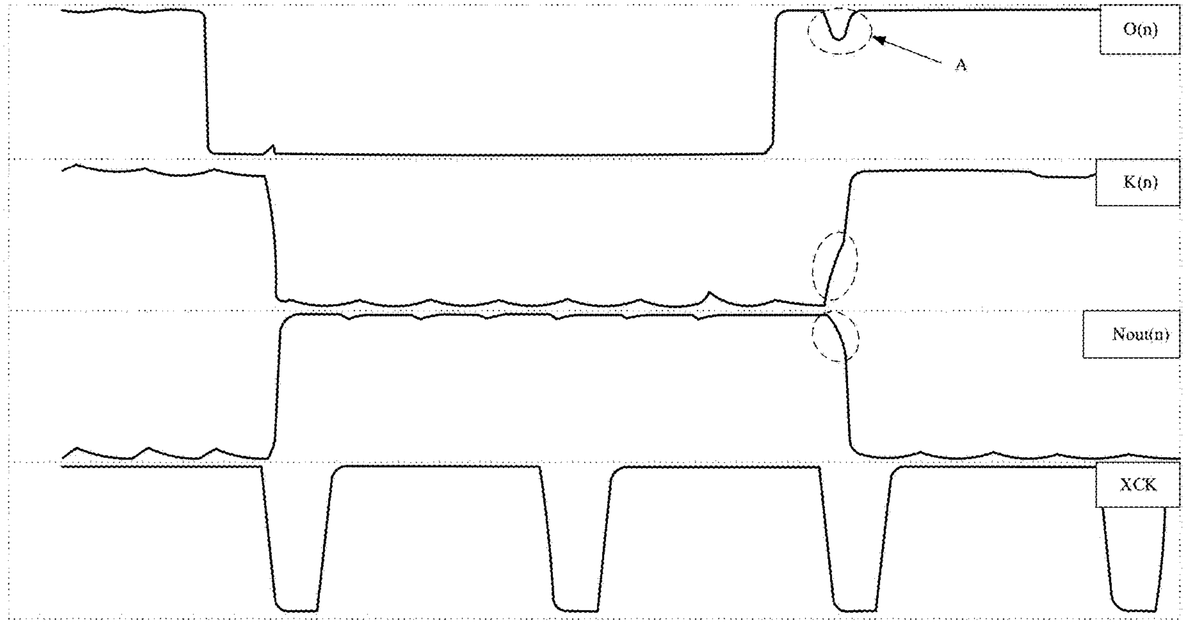

The decrease of the channel widths of the first output transistor To1 and the second output transistor To2 causes the driving capability of the gate driver circuit to decrease and the lapse of the first gate control signal Nscan to increase. Also, the output terminal of the first transistor T1 transmits the first power supply signal PVGH or the fourth power supply signal PVGL to the first node K through the third transistor T3 controlled by the first clock signal XCK. Accordingly, when the first clock signal XCK correspondingly controls the first output transistor To1 to be turned on at the same time, the load corresponding to the output terminal of the first transistor T1 increases, so that the high level of the output terminal of the first transistor T1 (i.e., at the point O) cannot be maintained, and a “pit” (at A as shown in FIG. 5B) appears, which affects the normal On state of the first output transistor To1 and deteriorates the output capability of the first gate control signal Nscan.

Therefore, the channel width of the first transistor T1 can be adjusted in order to ameliorate the problems that the high level at the output terminal of the first transistor T1 cannot be maintained and that the “pit” appears, and improve the lapse of the potential change of the first node K.

Optionally, the conductivity of the first transistor T1 to the first power supply signal PVGH may be increased by increasing the channel width of the first transistor T1 to ameliorate the “pit” occurring at the output terminal of the first transistor T1, and to improve the lapse of the potential change of the first node K corresponds to the pit occurring at the output terminal of the first transistor T1.

Optionally, the channel width of the first transistor T1 is greater than 4.95 micron so that the channel width of the first transistor T1 is greater than that of an existing design. It will be appreciated that the channel width of the first transistor T1 may be different for display panels of different sizes and different properties. Therefore, the channel width of the first transistor T1 can be adjusted according to actual requirements.

Figure 5C:
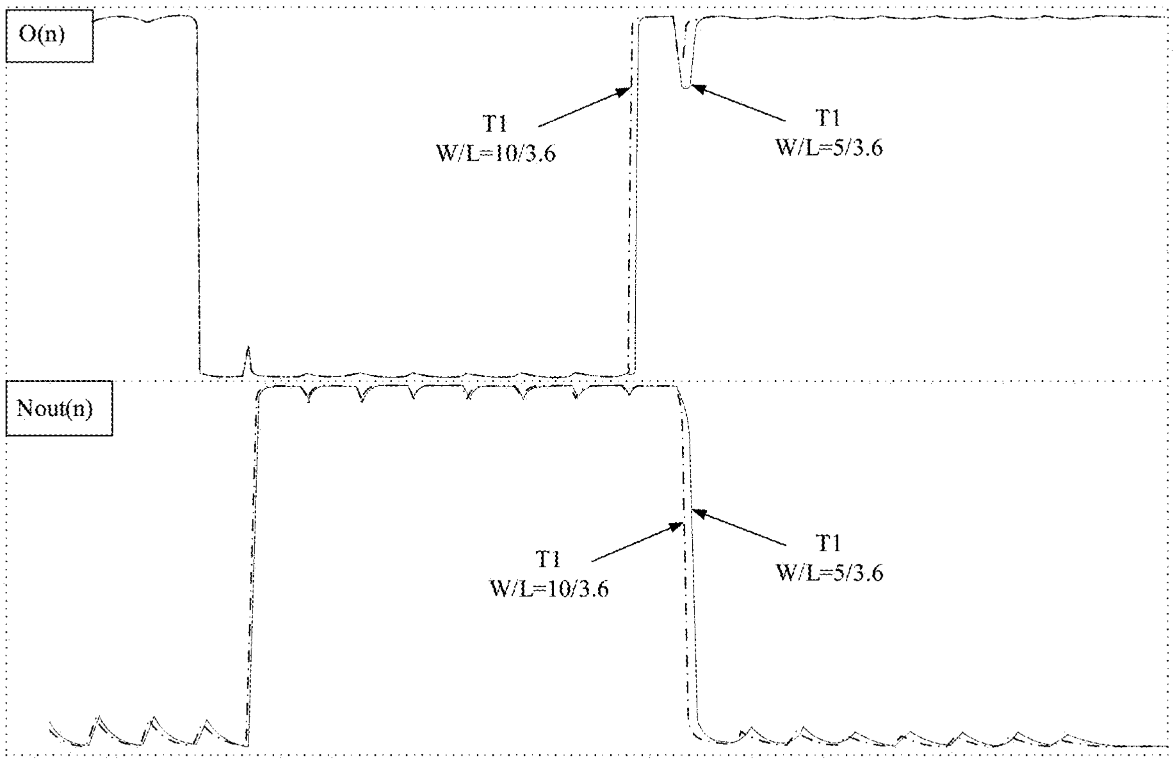
Figure 5D:
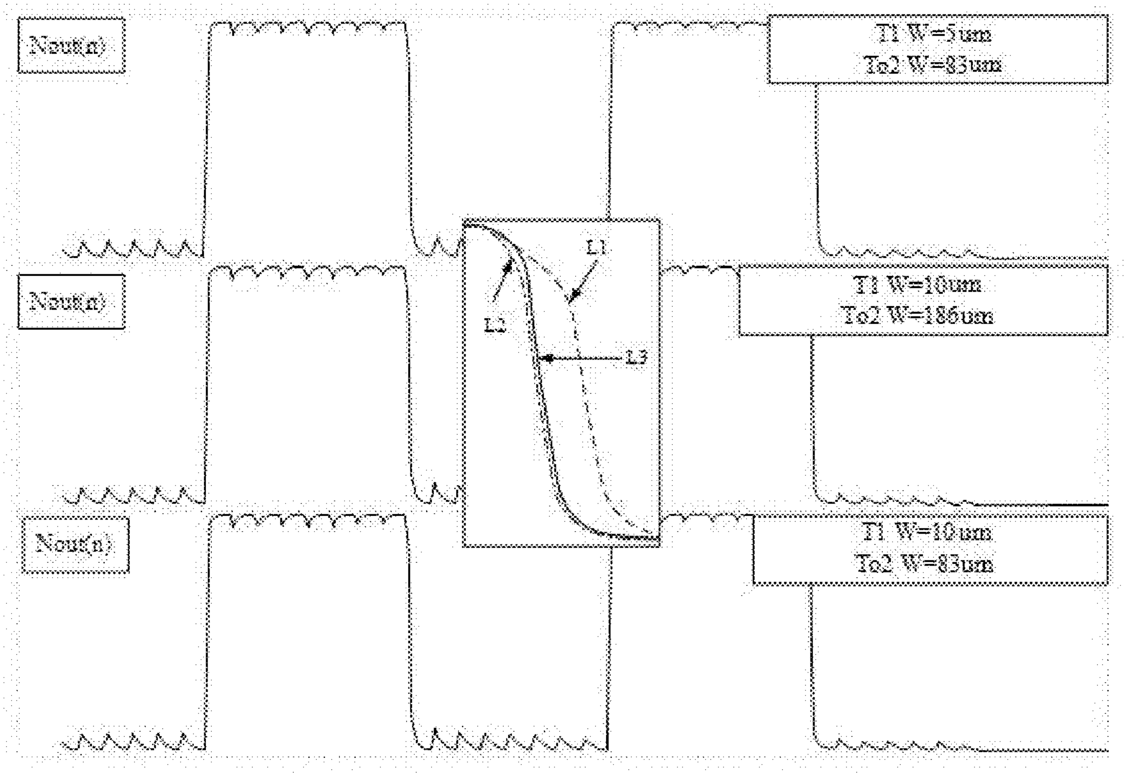

With continued reference to FIGS. 5C-5D, the inventors have performed simulations of a design with decreased channel widths of the first output transistor To1 and the second output transistor To2 and increased channel width of the first transistor T1, where W represents the channel width; W/L represents the width to length ratio; L1 corresponds to the case where the second output transistor To2 has a decreased channel width; L2 corresponds to the case where the first transistor T1 has an increased channel width; L3 corresponds to the case where the second output transistor To2 has a decreased channel width and the first transistor T1 has an increased channel width.

The simulations results in FIGS. 5C-5D show that the channel width of the first transistor T1 has been increased, the high-level output capability of the output terminal of the first transistor T1 increases, the pull-down effect of the first output transistor To1 becomes smaller, the influence on the output of the first gate control signal Nscan becomes smaller, and the lapse of the potential change from the high level to the low level (that is, ranging from 5% to 95%) of the first gate control signal Nscan is reduced from 1.05 microseconds to 0.66 microseconds.

The channel width of the second output transistor To2 has been decreased, the output load at the output terminal of the first transistor T1 decreases, and the high level voltage drop of the first gate control signal Nscan decreases by about 0.2V.

The channel width of the first transistor T1 has been increased, the channel width of the second output transistor To2 has been decreased, the lapse of the first gate control signal Nscan has been improved by about 0.4 microseconds, and the voltage drop of the first gate control signal Nscan has been improved by about 0.2V.

The simulations where the channel width of the first output transistor To1 is decreased to reduce the low-level voltage drop of the first gate control signal Nscan are similar to the simulations where the channel width of the second output transistor To2 is decreased to reduce the high-level voltage drop of the first gate control signal Nscan, and are not repeated.

Therefore, the design of the first output transistor To1 and the second output transistor To2 with decreased channel widths can be combined with the design of the first transistor T1 with an increased channel width to realize the reduction of the low-level voltage drop and the high-level voltage drop of the first gate control signal Nscan without significantly deteriorating the lapse of the duration during which the potential of the first gate control signal Nscan changes from the high level to the low level (i.e., with a range of 5%~95%).

The inventors have performed simulations for verification of the gate driver circuit where the control terminal of the fifth transistor T5 is electrically connected to the second node P(n−2) of the (n−2)-th-stage stage gate driver circuit GDC(n−2). The simulations results show that, when the control terminal of the fifth transistor T5 is controlled by the second node P(n−2) of the (n−2)-th-stage gate driver circuit GDC(n−2) instead of by the first gate control signal Nscan (n−2) output by the (n−2)-th-stage gate driver circuit GDC (n−2), the output load of the third power signal NVGH can be reduced, the voltage drop of the first gate control signal Nscan is improved by about 0.1V.

The inventors have performed simulations for verification of the design of the first output transistor To1 and the second output transistor To2 with decreased channel widths, and the simulations results show that when the channel widths of the first output transistor To1 and the second output transistor To2 are decreased, the pull-down of the voltage drop of the first gate control signal Nscan can be reduced.

Figure 6:
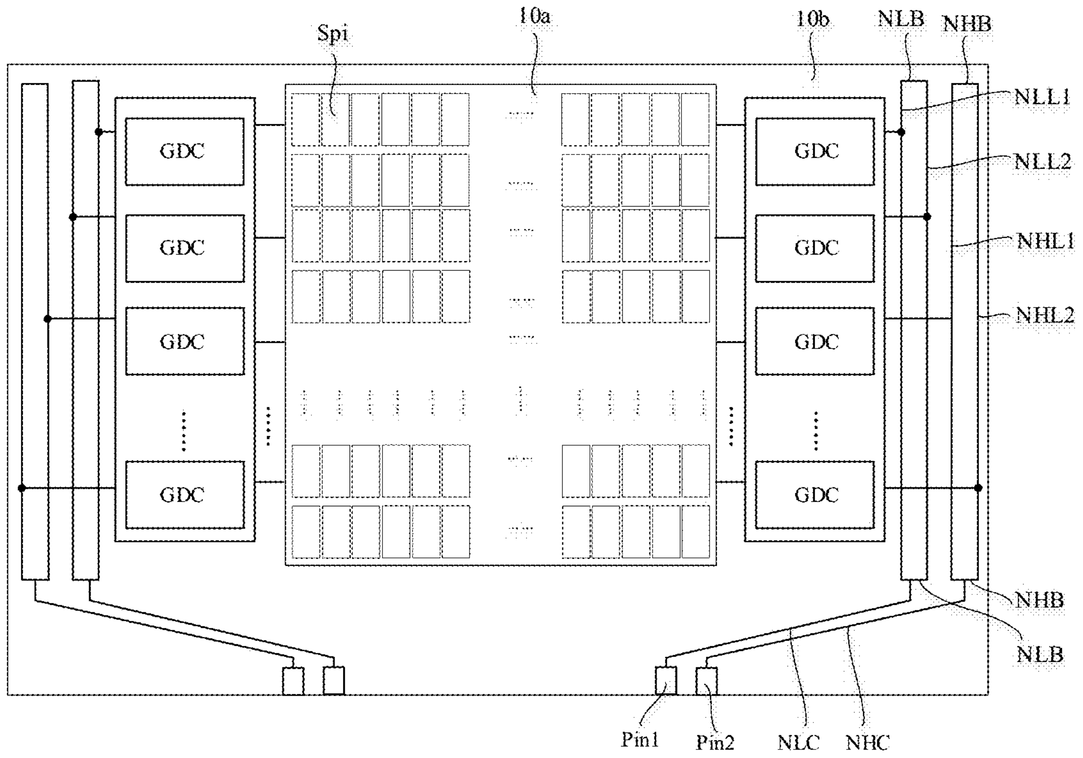
FIG. 6 is a schematic diagram showing structure of a display panel according to one or more embodiments of the present application.

FIG. 6 is a schematic structural diagram of a display panel according to one or more embodiments of the present application. The present application further provides a display panel including any gate driver unit as described above.

Optionally, the display panel includes a display area 10*a* and a non-display area 10*b* located at the periphery of the display area 10*a*, and the gate driver unit is located in the non-display area 10*b*.

The display panel includes a plurality of sub-pixels Spi, and at least one sub-pixel Spi includes a light emitting device Di and a pixel driver circuit for driving the light emitting device Di to emit light. Here, the plurality of sub-pixels Spi are located in the display area 10*a*.

Figure 7:
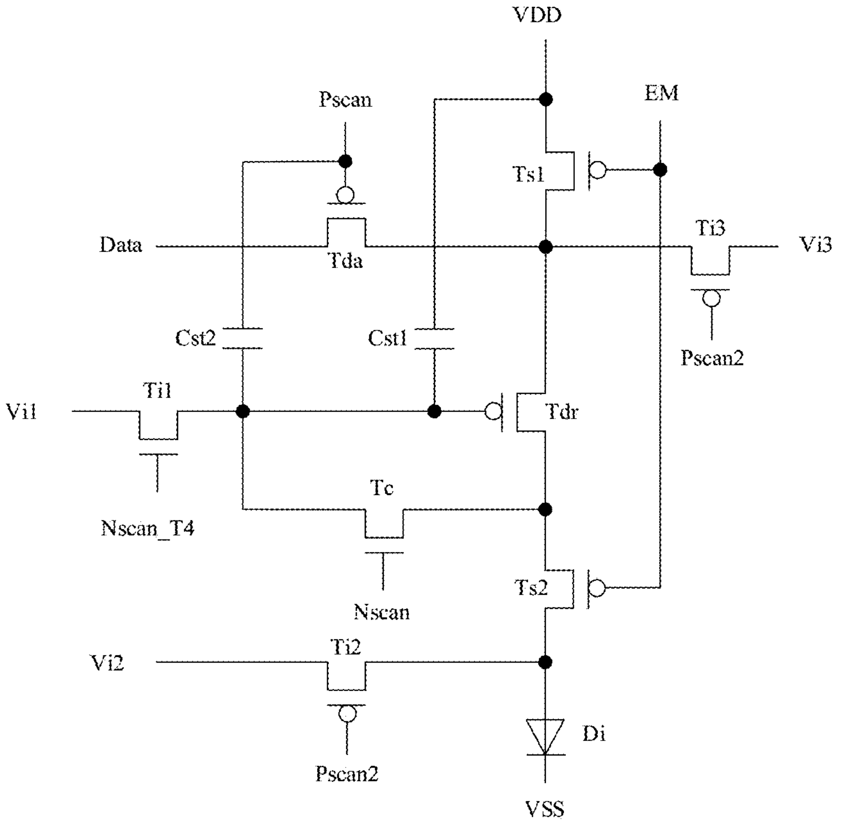
FIG. 7 is a schematic diagram showing structure of a pixel driver circuit according to one or more embodiments of the present application.

FIG. 7 is a schematic diagram showing structure of a pixel driver circuit according to one or more embodiments of the present application. The pixel drive circuit includes a driving transistor Tdr, a compensation transistor Tc, a data transistor Tda, a first reset transistor Ti1, a second reset transistor Ti2, a first switching transistor Ts1, a second switching transistor Ts2, a first capacitor C1, and a light emitting device.

The control terminal of the driving transistor Tdr is electrically connected to the output terminal of the first reset transistor Ti1, the input terminal of the driving transistor Tdr is electrically connected to the output terminal of the first switching transistor Ts1, and the output terminal of the driving transistor Tdr is electrically connected to the input terminal of the second switching transistor Ts2.

A control terminal of the compensation transistor Tc is configured to receive a corresponding gate control signal, an input terminal of the compensation transistor Tc is electrically connected to an output terminal of the driving transistor Tdr, and an output terminal of the compensation transistor Tc is electrically connected to the control terminal of the driving transistor Tdr.

The control terminal of the data transistor Tda is configured to receive a corresponding gate control signal, the input terminal of the data transistor Tda is configured to receive a corresponding data signal Data, and the output terminal of the data transistor Tda is electrically connected to the input terminal of the driving transistor Tdr.

The control terminal of the first reset transistor Ti1 is configured to receive a corresponding gate control signal, and the input terminal of the first reset transistor Ti1 is configured to receive the first reset signal Vi1.

The control terminal of the second reset transistor Ti2 is configured to receive a corresponding gate control signal, the input terminal of the second reset transistor Ti2 is configured to receive the second reset signal Vi2, and the output terminal of the second reset transistor Ti2 is electrically connected to the output terminal of the second switching transistor Ts2.

The control terminal of the first switching transistor Ts1 is configured to receive a corresponding light emission control signal EM, and the input terminal of the first switching transistor Ts1 is electrically connected to the first voltage terminal VDD.

The control terminal of the second switching transistor Ts2 is configured to receive a corresponding light emission control signal EM.

The first terminal of the first storage capacitor Cst1 is electrically connected to the first voltage terminal, and the second terminal of the first storage capacitor Cst1 is electrically connected to the control terminal of the driving transistor Tdr.

The anode of the light emitting device Di is electrically connected to the output terminal of the second switching transistor Ts2, and the cathode of the light emitting device Di is electrically connected to the second voltage terminal VSS.

Optionally, the light emitting device Di includes at least one type of organic light emitting diode, sub-millimeter light emitting diode, and micro light emitting diode.

Optionally, the control terminal of the compensation transistor Tc is configured to receive the first gate control signal Nscan, the control terminal of the data transistor Tda is configured to receive the second gate control signal Pscan. The first reset transistor Ti1 is configured to receive the third gate control signal Nscan_T4, and the control terminal of the second reset transistor Ti2 is configured to receive the fourth gate control signal Pscan2.

Optionally, the first gate control signal Nscan and the fourth gate control signal Pscan2 may be generated by the same gate driver unit or may be generated by different gate driver units.

Optionally, the second gate control signal Pscan and the fourth gate control signal Pscan2 may be generated by gate driver circuits of different stages in the same gate driver unit, or may be generated by different gate driver units.

Optionally, the control terminals of the first switching transistor Ts1 and the second switching transistor Ts2 may share the same light emission control signal EM, and different light emission control signals EM may be applied.

Optionally, the pixel driver circuit further includes a third reset transistor Ti3 whose input terminal is configured to receive a third reset signal Vi3. The output terminal of the third reset transistor Ti3 is electrically connected to the input terminal of the driving transistor Tdr. Optionally, the control terminal of the third reset transistor Ti3 is electrically connected to the control terminal of the second reset transistor Ti2.

Optionally, the pixel driver circuit further includes a second storage capacitor Cst2, a first terminal of which is electrically connected to the control terminal of the data transistor Tda, and a second terminal of which is electrically connected to the control terminal of the driving transistor Tdr.

Optionally, at least one of the compensation transistor Tc and the first reset transistor Ti1 is an oxide transistor.

Optionally, at least one of the compensation transistor Tc and the first reset transistor Ti1 is an N-type transistor.

Optionally, the first output terminals Nout of the plurality of gate driver circuits are electrically connected to the control terminals of the compensation transistors Tc of the plurality of sub-pixels, and the second output terminals Pout (n) of the plurality of gate driver circuits are electrically connected to the control terminals of the data transistors Tda of the plurality of sub-pixels, so that the data transistors Tda and the compensation transistors Tc of the plurality of sub-pixels are controlled by the gate driver unit, thereby realizing the write-in of the data signals Data and the compensation of a threshold voltage of the driving transistors Tdr.

Figure 8:
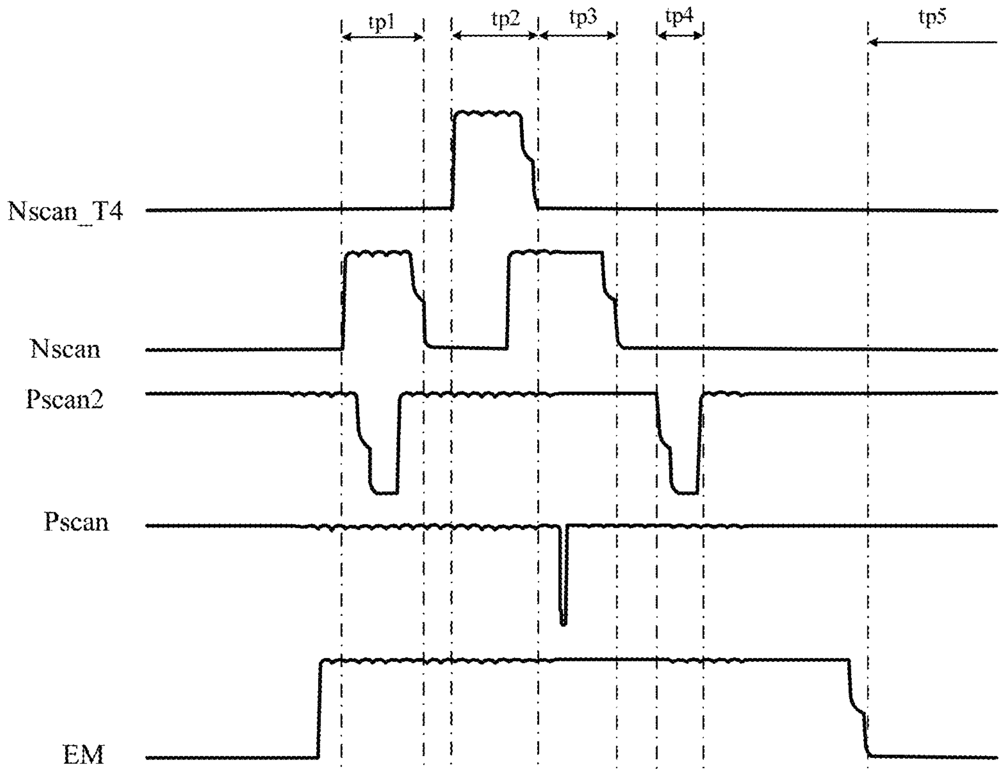
FIG. 8 is a timing diagram corresponding to the pixel driver circuit shown in FIG. 7.

FIG. 8 is a timing diagram corresponding to the pixel drive circuit shown in FIG. 7. The operation principle of the pixel drive circuit is briefly described by taking for example that the data transistor Tda and the first reset transistor Ti1 included in the pixel drive circuit are N-type transistors, and the driving transistor Tdr, the third reset transistor Ti3, the second reset transistor Ti2, the first switching transistor Ts1, and the second switching transistor Ts2 are all P-type transistors.

In the first reset phase tp1, the compensation transistor Tc, the second reset transistor Ti2, and the third reset transistor Ti3 are turned on, the third reset signal Vi3 resets the potentials of the input terminal, the control terminal, and the output terminal of the driving transistor Tdr, and the second reset signal Vi2 resets the potential of the anode of the light emitting device Di.

In the second reset phase tp2, the first reset transistor Ti1 is turned on, and the first reset signal Vi1 resets the potential of the control terminal of the driving transistor Tdr. The compensation transistor Tc is turned on, and the first reset signal Vi1 resets the potential at the output terminal of the driving transistor Tdr.

In the data writing phase tp3, the data transistor Tda and the compensation transistor Tc are turned on, and the data signal Data is written to the control terminal of the driving transistor Tdr.

In the third reset phase tp4, the second reset transistor Ti2 and the third reset transistor Ti3 are turned on, the third reset signal Vi3 resets the potential at the input terminal of the driving transistor Tdr, and the second reset signal Vi2 resets the potential of the anode of the light-emitting device Di.

In the light-emitting phase tp5, the first switching transistor Ts1 and the second switching transistor Ts2 are turned on, and the driving transistor Tdr generates a driving current to drive the light-emitting device Di to emit light.

Optionally, the first output terminals Nout of the plurality of gate driver circuits are electrically connected to the control terminals of the first reset transistors Ti1 of the plurality of sub-pixels.

With continued reference to FIG. 6, the non-display area 10*b* includes a fan-out area 10*c*, and the display panel includes a first power supply connection line NLC, a second power supply connection line NHC, a first pin Pin1, and a second pin Pin2 located in the fan-out area 10*c*.

The first power supply connection line NLC is electrically connected to the first pin Pin1, and is electrically connected to the plurality of gate driver circuits through the power supply sub-line transmitting the second power supply signal NVGL, so that the first power supply bus NLB, the first sub-power supply line NLL1, the third sub-power supply line NLL2, and the like are electrically connected to a power supply management chip through the first pin Pin1 and the first power supply connection line NLC, and the second power supply signal NVGL is generated through the power supply management chip.

The second power supply connection line NHC is electrically connected to the second pin Pin2, and is electrically connected to the plurality of gate driver circuits through the power supply sub-line transmitting the third power supply signal NVGH, so that the second power supply bus NHB, the second sub-power supply line NHL1, the fourth sub-power supply line NHL2, and the like are electrically connected to the power supply management chip through the second pin Pin2 and the second power supply connection line NHC, and the third power supply signal NVGH is generated through the power supply management chip.

Optionally, the square resistance of the first power supply connection line NLC is smaller than the square resistance of the sub-power supply line transmitting each first power supply signal PVGH, and the square resistance of the second power supply connection line NHC is smaller than the square resistance of the sub-power supply line transmitting each second power supply signal NVGL, so as to reduce the low-level voltage drop of the first gate control signal Nscan by reducing the resistance of the trace for transmitting the second power supply signal NVGL. The high-level voltage drop of the first gate control signal Nscan is reduced by reducing the resistance of the trace for transmitting the third power supply signal NVGH.

Optionally, the trace width of the first power supply connection line NLC may be made larger than the trace widths of the first sub-power supply line NLL1 and the third sub-power supply line NLL2, so that the square resistance of the first power supply connection line NLC is smaller than the square resistances of the first sub-power supply line NLL1 and the third sub-power supply line NLL2. The square resistance of the first power supply connection line NLC may also be adjusted by setting the first power supply connection line NLC as a multi-layer trace so that the square resistance of the first power supply connection line NLC is smaller than that of the first sub-power supply line NLL1 and of the third sub-power supply line NLL2.

Figure 9:
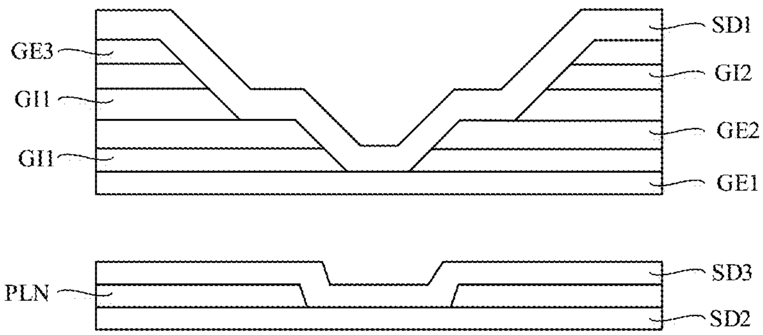
FIG. 9 is a cross-sectional view of a multi-layer trace according to one or more embodiments of the present application.

FIG. 9 is a cross-sectional view of a multi-layer trace according to one or more embodiments of the present application. The first power supply bus NLB or the first power supply connection line NLC may be prepared by the first gate layer GE1, the second gate layer GE2, the third gate layer GE3, and the first source-drain layer SD1 in the display panel. The first sub-power supply line NLL1 or the third sub-power supply line NLL2 may be prepared by the second source-drain layer SD2 and the third source-drain layer SD3. In this case, a first insulating layer GI1 is provided between the first gate layer GE1 and the second gate layer GE2. A first insulating layer GI1 and a second insulating layer GI2 are provided between the third gate layer GE3 and the second gate layer GE2. And a planarization layer PLN is provided between the second source-drain layer SD2 and the third source-drain layer SD3. Optionally, the preparation material of the first insulating layer GI1 includes SiNx and the preparation material of the second insulating layer GI2 includes SiO2.

It will be appreciated that the display panel also includes portions not shown such as a first active layer, a second active layer, where the first active layer includes a silicon semiconductor and the second active layer includes an oxide semiconductor.

Similarly, by making the trace width of the second power supply connection line NHC larger than that of the second sub-power supply line NHL1 and of the fourth sub-power supply line NHL2, the square resistance of the second power supply connection line NHC is smaller than that of the second sub-power supply line NHL1 and of the fourth sub-power supply line NHL2. The square resistance of the second power supply connection line NHC may also be adjusted by setting the second power supply connection line NHC as a multi-layer trace so that the square resistance of the second power supply connection line NHC is smaller than that of the second sub-power supply line NHL1 and of the fourth sub-power supply line NHL2.

TABLE I

| Scheme | Resistance | Resistance value/Ω | Voltage drop/V |
|---|---|---|---|
| 1 | R-WOA | 107 | −1.98 |
| | R-Bus | 364 | |
| 2 | R-WOA | 107*0.5 | −1.76 |
| | R-Bus | 364 | |

TABLE I-continued

| Scheme | Resistance | Resistance value/Ω | Voltage drop/V |
|---|---|---|---|
| 3 | R-WOA | 107 | −1.75 |
| | R-Bus | 364*0.5 | |
| 4 | R-WOA | 107*0.5 | −1.44 |
| | R-Bus | 364*0.5 | |

The inventors have performed simulations for verification of the design of the power supply bus and the power supply connection line with reduced trace resistances to improve the voltage drop of the first gate control signal Nscan. The simulations results are shown in Table I, where R-WOA denotes the resistance of the power connection line located in the fan-out area of the display panel, and R-BUS represents the resistance in the power supply bus.

According to the simulations results in Table I, when the resistance of the first power supply bus NLB is decreased to 0.5 times the original resistance (i.e., the resistance corresponding to a first power supply bus NLB which has same width as the first sub-power supply line NLL1 and is formed by a trace prepared by same layers as the first sub-power supply line NLL1), the resistance of the first power supply connection line NLC is decreased to 0.5 times the original resistance (i.e., the resistance corresponding to a first power supply connection line NLC which has same width as the first sub-power supply line NLL1 and is formed by a trace prepared by same layers as the first sub-power supply line NLL1), and the maximum voltage drop of the first gate control signal Nscan can be reduced by about 0.5V.

Thus, in order to improve the voltage drop of the first gate control signal Nscan, the present application provides following summarized schemes:

1. A scheme that the first transistor T1 of the n-th-stage gate driver circuit GDC(n) is controlled by the potential of the second node P(n-A) of the (n-A)-th-stage gate driver circuit GDC(n-A).

2. A scheme that the fourth transistor T4 of the n-th-stage gate driver circuit GDC(n) is controlled by the potential of the second node P(n-B) of the (n-B)-th-stage gate driver circuit GDC(n-B).

3. A scheme that the fifth transistor T5 of the n-th-stage gate driver circuit GDC(n) is controlled by the potential of the second node P(n-C) of the (n-C)-th-stage gate driver circuit GDC(n-C).

4. A scheme that the gate driver circuits of two or three adjacent stages are connected to different power supply lines to receive the second power supply signals NVGL.

5. A scheme that the gate driver circuits of two or three adjacent stages are connected to different power supply lines to receive the third power supply signals NVGH.

6. A scheme that the trace resistance of the power supply bus transmitting the second power signal NVGL is decreased.

7. A scheme that the trace resistance of the power supply bus transmitting the third power signal NVGH is decreased.

8. A scheme that the channel width of the first output transistor To1 is reduced.

9. A scheme that the channel width of the second output transistor To2 is reduced.

10. A scheme that the channel width of the first transistor T1 is increased.

11. A scheme that the trace resistance of the power supply connection line for transmitting the second power supply signal NVGL is decreased.

12. A scheme that the trace resistance of the power supply connection line for transmitting the third power supply signal NVGH is decreased.

Among them, the above twelve schemes may be implemented separately or may be implemented in any combination.

Table II is a comparison table which show the simulations parameters obtained by the inventors combining different schemes, where the NVGH-GOA resistance represents a resistance of the sub-power supply line and the power supply bus for transmitting the third power supply signal NVGH; the NVGH-WOA resistance represents a resistance of the power supply connection line transmitting the third power supply signal NVGH and located in the fan-out area of the display panel; the NVGL-GOA resistance represents the resistance of the sub-power supply line and the power supply bus for transmitting the second power supply signal NVGL; and the NVGL-WOA resistance represents the resistance of the power supply connection line transmitting the second power supply signal NVGL and located in the fan-out area of the display panel.

TABLE II

| Category | Reference value | NVGH Impedance ↓ | NVGH Impedance ↓ | T1 W↑ | To2 W↓ | T10 W↓ | Total |
|---|---|---|---|---|---|---|---|
| NVGH-GOA resistance/Ω | 365 | 365*0.3 | 365 | 365 | 365 | 365 | 365*0.3 |
| NVGH-WOA resistance/Ω | 107 | 107 "0.3 | 107 | 107 | 107 | 107 | 107*0.3 |
| NVGL-GOA resistance/Ω | 365 | 365 | 365*0.3 | 365 | 365 | 365 | 65*0.3 |
| NVGL-WOA resistance/Ω | 111 | 111 | 111*0.3 | 111 | 111 | 111 | 111*0.3 |
| T1 W/um | 4.95 | 4.95 | 4.95 | 4.95*2 | 4.95 | 4.95 | 4.95*2 |
| To2 W/um | 186 | 186 | 186 | 186 | 186*0.5 | 186 | 186*0.5 |
| To1 W/um | 288 | 288 | 288 | 288 | 288 | 288*0.5 | 288*0.5 |
| Nout Lapse (5%~95%)/us | 1.06 | 1.02 | 1.1 | 0.675 | 1.06 | 1.11 | 0.757 |
| Nout-High-Level Voltage Drop/v | −1.94 | −1.08 | −1.94 | −1.82 | −1.66 | −1.67 | −0.77 |
| Nout-Low-Level Voltage Drop/v | −1.5 | −1.5 | −0.69 | −1.5 | −1.39 | −1.14 | −0.51 |

According to the data in Table II, with the design of combined scheme 6-scheme 12, the high-level voltage drop of the first gate control signal Nscan may be reduced by 1.17V, which is 0.27V larger than that simulated for a conventional gate driver circuit using 8 transistors; the low-level voltage drop of the first gate control signal Nscan is reduced by 0.99V, which is 0.2V larger than that simulated for a conventional gate driver circuit using 8 transistors; and the lapse of the duration during which the first gate control signal Nscan changes from the high level to the low level is reduced by 0.4 microseconds.

Further, the channel widths of the first output transistor To1 and the second output transistor To2 are reduced, so that the frame size of the display panel adopting the gate driver unit can be reduced (the saved frame size is in the range of 50~60 micron), so that the frame size occupied by the gate driver unit including the gate driver circuit structure shown in FIG. 4 when applied to the display panel can be equal to the frame size occupied by a gate driver unit including the conventional gate driver circuit structure of 8 transistors, thereby facilitating reduction of the frame size of the display panel.

The principles and embodiments of the present application have been elucidated with reference to specific examples, the description of which is merely intended to aid in the understanding of the method of the present application and its core idea. At the same time, variations will occur to those skilled in the art in both the detailed description and the scope of application in accordance with the teachings of the present application. In view of the foregoing, the present description should not be construed as limiting the application.

What is claimed is:

1. A gate driver unit comprising a plurality of gate driver circuits, at least one of the gate driver circuits each comprising:

a first node control module electrically connected to a first node of the gate driver circuit at a present stage and a second node of the gate driver circuit at the present stage, and configured to transmit a first power supply signal to the first node according to a potential of the second node and a corresponding first clock signal, or transmit a second power supply signal to the first node according to the potential of the second node;

an output control module electrically connected to the first node of the gate driver circuit and a third node of the gate driver circuit at the present stage, and configured to electrically connect the first node and the third node, or to disconnect an electrical connection between the first node and the third node; and a second output module electrically connected to the second node, the third node, and a second output terminal of the gate driver circuit at the present stage, and configured to output a corresponding second clock signal or the first power supply signal to the second output terminal according to the potential of the second node and a potential of the third node; and wherein at least one of the first node control module and the output control module is electrically connected to the second node of the gate driver circuit at a preceding stage.

2. The gate driver unit according to claim 1, wherein the first node control module of an n-th-stage gate driver circuit of the plurality of gate driver circuits is electrically connected to the second node of an (n−1)-th-stage gate driver circuit of the plurality of gate driver circuits, and the first node control module of the n-th-stage gate driver circuit is configured to transmit the first power supply signal or a fourth power supply signal to the first node according to a potential of the second node of the (n−1)-th-stage gate driver circuit and the corresponding first clock signal.

3. The gate driver unit according to claim 2, wherein the first node control module comprises:

a first transistor, an input terminal of the first transistor being configured to receive the first power supply signal;

a second transistor, a first control terminal and a second control terminal of the second transistor being electrically connected to a control terminal of the first transistor, an input terminal of the second transistor being configured to receive the fourth power supply signal, and an output terminal of the second transistor being electrically connected to the output terminal of the first transistor; and a third transistor, a control terminal of the third transistor being configured to receive the corresponding first clock signal, an input terminal of the third transistor being electrically connected to the output terminal of the first transistor, and an output terminal of the third transistor being electrically connected to the first node; and wherein the control terminal of the first transistor of the n-th-stage gate driver circuit is electrically connected to the second node of the (n−1)-th-stage gate driver circuit.

4. The gate driver unit according to claim 1, wherein the output control module comprises:

a fourth transistor, an input terminal of the fourth transistor being electrically connected to the first node;

a fifth transistor, an input terminal of the fifth transistor being electrically connected to an output terminal of the fourth transistor, and an output terminal of the fifth transistor being electrically connected to the third node of the gate driver circuit at the present stage; and a first capacitor, a first terminal of the first capacitor being electrically connected to a control terminal of the fourth transistor, and a second terminal of the first capacitor being electrically connected to the output terminal of the fourth transistor; and wherein at least one of the control terminal of the fourth transistor and a control terminal of the fifth transistor is electrically connected to the second node of the gate driver circuit at the preceding stage.

5. The gate driver unit according to claim 4, wherein a control terminal of the fourth transistor of the n-th-stage gate driver circuit is electrically connected to the second node of an (n−10)-th-stage gate driver circuit of the plurality of gate driver circuits.

6. The gate driver unit according to claim 4, wherein a control terminal of the fifth transistor of the n-th-stage gate driver circuit is electrically connected to the second node of an (n−2)-th-stage gate driver circuit of the plurality of gate driver circuits.

7. The gate driver unit according to claim 1, wherein the at least one of the gate driver circuits each further comprises:

a first output module electrically connected to the first node of the gate driver circuit at the present stage and a first output terminal of the gate driver circuit at the present stage, and configured to output the second power supply signal or a third power supply signal to the first output terminal according to a potential of the first node;

wherein the first output module comprises:

a first output transistor, a control terminal of the first output transistor being electrically connected to the first node of the gate driver circuit at the present stage, an input terminal of the first output transistor being configured to receive the second power supply signal; and a second output transistor, a control terminal of the second output transistor being electrically connected to the first node of the gate driver circuit at the present stage, an input terminal of the second output transistor being configured to receive the third power supply signal, and an output terminal of the second output transistor and an output terminal of the first output transistor being electrically connected to the first output terminal of the gate driver circuit at the present stage;

wherein a channel width of the first output transistor is different from a channel width of the second output transistor.

8. The gate driver unit according to claim 7, wherein the input terminal of the first output transistor of the gate driver circuit at a stage of an odd number is electrically connected to a first sub-power supply line for transmitting the second power supply signal, and the input terminal of the second output transistor of the gate driver circuit at the stage of the odd number is electrically connected to a second sub-power supply line for transmitting the third power supply signal; the input terminal of the first output transistor of the gate driver circuit of a stage of an even number is electrically connected to a third sub-power supply line for transmitting the second power supply signal, and the input terminal of the second output transistor of the gate driver circuit of the stage of the even number is electrically connected to a fourth sub-power supply line for transmitting the third power supply signal.

9. The gate driver unit according to claim 7, wherein the input terminal of the first output transistor of a (1+3m)-th-stage gate driver circuit is electrically connected to a first sub-power supply line for transmitting the second power supply signal, and the input terminal of the second output transistor of the (1+3m)-th-stage gate driver circuit is electrically connected to a second sub-power supply line for transmitting the third power supply signal; wherein $m \geq 0$;

the input terminal of the first output transistor of a (2+3m)-th-stage gate driver circuit is electrically connected to a third sub-power supply line for transmitting the second power supply signal, and the input terminal of the second output transistor of the (2+3m)-th-stage gate driver circuit is electrically connected to a fourth sub-power supply line for transmitting the third power supply signal; and the input terminal of the first output transistor of a (3+3m)-th-stage gate driver circuit is electrically connected to a fifth sub-power supply line for transmitting the second power supply signal, and the input terminal of the second output transistor of the (3+3m)-th-stage gate driver circuit is electrically connected to a sixth sub-power supply line for transmitting the third power supply signal.

10. The gate driver unit according to claim 8, wherein the first sub-power supply line and the third sub-power supply line are electrically connected to a first power supply bus; and wherein a square resistance of the first power supply bus is smaller than a square resistance of the first sub-power supply line, and the square resistance of the first power supply bus is smaller than a square resistance of the third sub-power supply line.

11. The gate driver unit according to claim 8, wherein the second sub-power supply line and the fourth sub-power supply line are electrically connected to a second power supply bus; and wherein a square resistance of the second power supply bus is smaller than a square resistance of the second sub-power supply line, and the square resistance of the second power supply bus is smaller than a square resistance of the fourth sub-power supply line.

12. The gate driver unit of claim 7, wherein the channel width of the first output transistor is less than 288 microns and the channel width of the second output transistor has is less than 186 microns.

13. The gate driver unit of claim 3, wherein a channel width of the first transistor is greater than 4.95 microns.

14. The gate driver unit according to claim 1, wherein the first node control module comprises a sixth transistor, a seventh transistor, and an eighth transistor; a first control terminal and a second control terminal of the sixth transistor are configured to receive the corresponding first clock signal, and an input terminal of the sixth transistor is electrically connected to the first node; a control terminal of the seventh transistor is electrically connected to the second node of the gate driver circuit at the present stage, an input terminal of the seventh transistor is configured to receive the first power supply signal, and an output terminal of the seventh transistor is electrically connected to an output terminal of the sixth transistor; a control terminal of the eighth transistor is electrically connected to the second node of the gate driver circuit at the present stage, an input terminal of the eighth transistor is configured to receive the second power supply signal, and an output terminal of the eighth transistor is electrically connected to the first node of the gate driver circuit at the present stage;

the second output module comprises a third output transistor, a fourth output transistor and a second capacitor, a control terminal of the third output transistor is electrically connected to the third node of the gate driver circuit at the present stage, and an input terminal of the third output transistor is configured to receive the corresponding second clock signal; a control terminal of the fourth output transistor is electrically connected to the second node of the gate driver circuit at the present stage, an input terminal of the fourth output transistor is configured to receive the first power supply signal, and an output terminal of the third output transistor and an output terminal of the fourth output transistor are electrically connected to the second output terminal of the gate driver circuit at the present stage; a first terminal of the second capacitor is electrically connected to the control terminal of the third output transistor, and a second terminal of the second capacitor is electrically connected to the output terminal of the third output transistor; and the at least one of the gate driver circuits each further comprises a second node control module, the second node control module comprises a ninth transistor and a tenth transistor, a control terminal of the ninth transistor is electrically connected to the first node of the gate driver circuit at the present stage, an input terminal of the ninth transistor is configured to receive the first power supply signal, and an output terminal of the ninth transistor is electrically connected to the second node of the gate driver circuit at the present stage; a control terminal of the tenth transistor is electrically connected to the first node of the gate driver circuit at the present stage, an input terminal of the tenth transistor is configured to receive a fourth power supply signal, and an output terminal of the tenth transistor is electrically connected to the second node of the gate driver circuit at the present stage.

15. A display panel, comprising:

a gate driver unit comprising a plurality of gate driver circuits, at least one of the gate driver circuits each comprising a first node control module, an output control module, and a second output module; wherein the first node control module is electrically connected to a first node of the gate driver circuit at a present stage and a second node of the gate driver circuit at the present stage, and the first node control module is configured to transmit a first power supply signal to the first node according to a potential of the second node and a corresponding first clock signal, or transmit a second power supply signal to the first node according to the potential of the second node; the output control module is electrically connected to the first node of the gate driver circuit at the present stage and to a third node of the gate driver circuit at the present stage, and the output control module is configured to electrically connect the first node and the third node or to disconnect an electrical connection between the first node and the third node; the second output module is electrically connected to the second node, the third node, and a second output terminal of the gate driver circuit at the present stage, the second output module is configured to output a corresponding second clock signal or the first power supply signal to the second output terminal according to the potential of the second node and a potential of the third node, and wherein at least one of the first node control module and the output control module is electrically connected to the second node of the gate driver circuit at a preceding stage; and a plurality of sub-pixels, at least one of the sub-pixels each comprising a light emitting device and a pixel driver circuit for driving the light emitting device to emit light, the pixel driver circuit comprising a driving transistor, a compensation transistor and a data transistor, an input terminal and an output terminal of the compensation transistor being electrically connected between a control terminal and an output terminal of the driving transistor, an input terminal of the data transistor being configured to receive a corresponding data signal, and an output terminal of the data transistor being electrically connected to the input terminal of the driving transistor; and wherein the first output terminals of the plurality of gate driver circuits are electrically connected to the control terminals of the compensation transistors of the plurality of sub-pixels, and the second output terminals of the plurality of gate driver circuits are electrically connected to the control terminals of the data transistors of the plurality of sub-pixels.

16. The display panel according to claim 15, wherein the display panel comprises a display area and a non-display area located at a periphery of the display area, the non-display area comprises a fan-out area;

the display panel comprises a first power connection line, a second power connection line, a first pin, and a second pin located in the fan-out area; the first power connection line is electrically connected to the first pin, and is electrically connected to the plurality of gate driver circuits through a sub-power supply line for transmitting the second power signal, and the second power connection line is electrically connected to the second pin, and is electrically connected to the plurality of gate driver circuits through a sub-power supply line for transmitting the third power signal; and wherein the plurality of sub-pixels are located in the display area, the gate driver unit is located in the non-display area, a square resistance of the first power supply connection line is less than a square resistance of the sub-power supply line for transmitting each first power supply signal, and a square resistance of the second power supply connection line is less than a square resistance of the sub-power supply line for transmitting each second power supply signal.

17. The display panel according to claim 15, wherein the first node control module of an n-th-stage gate driver circuit is electrically connected to the second node of an (n-A)-th-stage gate driver circuit, and the first node control module of the n-th-stage gate driver circuit is configured to transmit the first power supply signal or a fourth power supply signal to the first node according to the potential of the second node of the (n-A)-th-stage gate driver circuit and the corresponding first clock signal; $A \geq 1$.

18. The display panel of claim 17, wherein the first node control module comprises:

a first transistor, an input terminal of which being configured to receive the first power supply signal;

a second transistor, a first control terminal and a second control terminal of which being electrically connected to a control terminal of the first transistor, an input terminal of which being configured to receive the fourth power supply signal, and an output terminal of which being electrically connected to the output terminal of the first transistor; and a third transistor, a control terminal of which being configured to receive the corresponding first clock signal, an input terminal of which being electrically connected to the output terminal of the first transistor, and an output terminal of which being electrically connected to the first node; and wherein the control terminal of the first transistor of the n-th-stage gate driver circuit is electrically connected to the second node of the (n-A)-th-stage gate driver circuit.

19. The display panel according to claim 15, wherein the output control module comprises:

a fourth transistor, an input terminal of the fourth transistor being electrically connected to the first node;

a fifth transistor, an input terminal of the fifth transistor being electrically connected to an output terminal of the fourth transistor, and an output terminal of the fifth transistor being electrically connected to the third node of the gate driver circuit at the present stage; and a first capacitor, a first terminal of the first capacitor being electrically connected to a control terminal of the fourth transistor, and a second terminal of the first capacitor being electrically connected to the output terminal of the fourth transistor; and wherein a control terminal of the fifth transistor of the n-th-stage gate driver circuit is electrically connected to the second node of an (n-C)-th-stage gate driver circuit of the plurality of gate driver circuits; $C \geq 1$;

wherein the control terminal of the fourth transistor of the n-th-stage gate driver circuit is electrically connected to the second node of an (n-B)-th-stage gate driver circuit of the plurality of gate driver circuits; C<B.

20. The display panel according to claim 15, wherein the at least one of the gate driver circuits each further comprises:

a first output module electrically connected to the first node of the gate driver circuit at the present stage and a first output terminal of the gate driver circuit at the present stage, and configured to output the second power supply signal or a third power supply signal to the first output terminal according to a potential of the first node;

wherein the at least one of the gate driver circuits each further comprises:

a first output module electrically connected to the first node of the gate driver circuit at the present stage and a first output terminal of the gate driver circuit at the present stage, and configured to output the second power supply signal or a third power supply signal to the first output terminal according to a potential of the first node;

wherein the first output module comprises:

a first output transistor, a control terminal of the first output transistor being electrically connected to the first node of the gate driver circuit at the present stage, an input terminal of the first output transistor being configured to receive the second power supply signal; and a second output transistor, a control terminal of the second output transistor being electrically connected to the first node of the gate driver circuit at the present stage, an input terminal of the second output transistor being configured to receive the third power supply signal, and an output terminal of the second output transistor and an output terminal of the first output transistor being electrically connected to the first output terminal of the gate driver circuit at the present stage;

wherein a channel width of the first output transistor is different from a channel width of the second output transistor.

* * * * *